(12) United States Patent
Suzuki

(10) Patent No.: US 10,458,689 B2
(45) Date of Patent: Oct. 29, 2019

(54) REFRIGERATION CYCLE APPARATUS AND REFRIGERATION CYCLE SYSTEM

(71) Applicant: Mitsubishi Electric Corporation, Tokyo (JP)

(72) Inventor: Yasuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 15/534,725

(22) PCT Filed: Nov. 27, 2015

(86) PCT No.: PCT/JP2015/083331
§ 371 (c)(1),
(2) Date: Jun. 9, 2017

(87) PCT Pub. No.: WO2016/157615
PCT Pub. Date: Oct. 6, 2016

(65) Prior Publication Data
US 2018/0094844 A1    Apr. 5, 2018

(30) Foreign Application Priority Data

Apr. 3, 2015 (WO) .................. PCT/JP2015/060669

(51) Int. Cl.
*F25B 49/02* (2006.01)
*F25B 49/00* (2006.01)
*F25B 13/00* (2006.01)

(52) U.S. Cl.
CPC ............. *F25B 49/02* (2013.01); *F25B 13/00* (2013.01); *F25B 49/005* (2013.01);
(Continued)

(58) Field of Classification Search
CPC ........ F25B 2313/029; F25B 2313/0293; F25B 2500/222; F25B 2600/05; F25B 49/005; F25B 49/02
See application file for complete search history.

(56) References Cited

U.S. PATENT DOCUMENTS 5,918,475 A * 7/1999 Sakakibara ............ B60H 1/008
62/126
6,046,054 A * 4/2000 McGeehin ............. G01N 27/12
422/90
(Continued)

FOREIGN PATENT DOCUMENTS

JP        08327195 A     12/1996
JP       H10-300294 A    11/1998
WO      2016/084128 A1    6/2016

OTHER PUBLICATIONS

International Search Report of the International Searching Authority dated Mar. 1, 2016 for the corresponding international application No. PCT/JP2015/083331 (and English translation).
(Continued)

*Primary Examiner* — Henry T Crenshaw
(74) *Attorney, Agent, or Firm* — Posz Law Group, PLC

(57) ABSTRACT

Provided is a refrigeration cycle apparatus including: a refrigeration cycle configured to circulate refrigerant; a heat exchanger unit configured to accommodate at least a heat exchanger of the refrigeration cycle; and a controller configured to control the heat exchanger unit, in which: the heat exchanger unit includes: an air-blowing fan; and a refrigerant detection unit configured to detect a concentration of leaked refrigerant and to output a detection signal to the controller; and the controller is configured to operate the air-blowing fan when detecting leakage of the refrigerant, and to stop the air-blowing fan triggered by becoming
(Continued)

positive from negative of a temporal change of the concentration of the leaked refrigerant.

25 Claims, 18 Drawing Sheets

(52) U.S. Cl.
CPC . *F25B 2313/027* (2013.01); *F25B 2313/0293* (2013.01); *F25B 2313/02741* (2013.01); *F25B 2500/222* (2013.01)

(56) References Cited

U.S. PATENT DOCUMENTS

| | | | | |
|---|---|---|---|---|
| 6,073,455 | A * | 6/2000 | Tachigori | F25B 49/005 62/129 |
| 2001/0035022 | A1 * | 11/2001 | Horey | F25C 1/12 62/340 |
| 2002/0178738 | A1 * | 12/2002 | Taira | F25B 49/005 62/129 |
| 2005/0066676 | A1 * | 3/2005 | Ochiai | B60H 1/3204 62/228.3 |
| 2012/0292006 | A1 | 11/2012 | Yamashita et al. | |
| 2013/0192283 | A1 * | 8/2013 | Yamashita | F24F 1/32 62/126 |
| 2014/0196483 | A1 * | 7/2014 | Okazaki | F25B 49/02 62/79 |
| 2016/0245566 | A1 * | 8/2016 | Hiraki | F25B 49/005 |
| 2017/0292744 | A1 | 10/2017 | Suzuki et al. | |

OTHER PUBLICATIONS

Japanese Office Action dated Nov. 24, 2015 for the corresponding JP application No. 2015-190190. (and English translation).
Japanese Office Action dated Sep. 27, 2016 for the corresponding JP application No. 2016-120644. (and English translation).
Office Action dated Apr. 26, 2018 issued in corresponding AU patent application No. 2015389752.
Extended European Search Report dated Aug. 3, 2017 issued in corresponding EP application No. 15887757.1.
Office Action dated May 7, 2019 issued in corresponding CN patent application No. 201580078277.9 (and English translation).

* cited by examiner

US 10,458,689 B2

REFRIGERATION CYCLE APPARATUS AND REFRIGERATION CYCLE SYSTEM

This application is a U.S. national stage application of PCT/JP2015/083331 filed on Nov. 27, 2015, which claims priority to international Patent Application No. PCT/JP2015/060669 filed on Apr. 3, 2015, the contents of which are incorporated herein by reference.

TECHNICAL FIELD

The present invention relates to a refrigeration cycle apparatus and a refrigeration cycle system.

BACKGROUND ART

In Patent Literature 1, a refrigeration apparatus is disclosed. The refrigeration apparatus includes a refrigerant detection unit configured to detect a refrigerant leakage and a controller configured to drive an air-blowing fan for a condenser or for an evaporator when the refrigerant detection unit detects a refrigerant leakage. In the refrigeration apparatus, refrigerant is diffused or exhausted by the air-blowing fan driven by the controller when a refrigerant leakage occurs, to thereby prevent an increase in a refrigerant concentration at a predetermined point. The controller is configured to stop driving the air-blowing fan when the refrigerant is no longer detected by the refrigerant detection unit as a result of diffusing or exhausting the refrigerant after the air-blowing fan is driven due to the detection of a refrigerant leakage. Further, in Patent Literature 1, it is disclosed that, after the detection of the refrigerant leakage, irrespective of the subsequent detection signals, the air-blowing fan may be driven for a fixed time period with a timer or driven until a worker turns on a switch for stopping energization.

CITATION LIST

Patent Literature

Patent Literature 1: Japanese Unexamined Patent Application Publication No. Hei 8-327195

SUMMARY OF INVENTION

Technical Problem

However, in the refrigeration apparatus according to Patent Literature 1, the controller is configured to stop the air-blowing fan when the refrigerant detection unit no longer detects refrigerant to stop outputting a detection signal, that is, when a concentration of leaked refrigerant becomes zero. Therefore, the air-blowing fan keeps being driven unless an indoor refrigerant concentration becomes zero, and unnecessary energy is consumed, which raises a problem in that a user is made to pay an unnecessary electricity expense. Meanwhile, when the air-blowing fan is driven for a fixed time period with a timer or driven until a worker turns off a switch to stop energization, refrigerant still leaks even after the air-blowing fan is stopped. Therefore, there is a problem in that the indoor refrigerant concentration is liable to increase locally after the air-blowing fan is stopped.

Further, once the refrigerant detection unit (for example, hot-wire type semiconductor gas sensor) is exposed to a refrigerant atmosphere, detection characteristics of the refrigerant detection unit are changed. However, it is difficult to determine whether or not the hot-wire type semiconductor gas sensor has been exposed to the refrigerant atmosphere, and hence there is a problem in that the refrigerant detection unit having the changed detection characteristics is liable to be kept in continuous use.

In addition, there is a problem in that, when a failure occurs in the refrigerant detection unit, the failed refrigerant detection unit is liable to be kept in continuous use.

The present invention has been made in order to overcome at least one of the above-mentioned problems, and has a first object to provide a refrigeration cycle apparatus and a refrigeration cycle system that are capable of inhibiting a refrigerant concentration from increasing locally even if refrigerant leaks and preventing unnecessary energy from being consumed.

Further, the present invention has a second object to provide a refrigeration cycle apparatus and a refrigeration cycle system that are capable of preventing a refrigerant detection unit having changed detection characteristics from being kept in continuous use.

Further, the present invention has a third object to provide a refrigeration cycle apparatus and a refrigeration cycle system that are capable of preventing a failed refrigerant detection unit from being kept in continuous use.

Solution to Problem

According to one embodiment of the present invention, there is provided a refrigeration cycle apparatus, including: a refrigeration cycle configured to circulate refrigerant; a heat exchanger unit configured to accommodate at least a heat exchanger of the refrigeration cycle; and a controller configured to control the heat exchanger unit, in which: the heat exchanger unit includes: an air-blowing fan; and a refrigerant detection unit configured to detect a concentration of leaked refrigerant and to output a detection signal to the controller; and the controller is configured to operate the air-blowing fan when detecting leakage of the refrigerant, and to stop the air-blowing fan triggered by becoming positive from negative of a temporal change of the concentration of the leaked refrigerant.

Further, according to one embodiment of the present invention, there is provided a refrigeration cycle apparatus, including: a refrigeration cycle configured to circulate refrigerant; a heat exchanger unit configured to accommodate at least a heat exchanger of the refrigeration cycle; and a controller configured to control the heat exchanger unit, in which: the heat exchanger unit includes: an air-blowing fan; and a refrigerant detection unit configured to detect a concentration of leaked refrigerant and to output a detection signal to the controller; and the controller is configured to operate the air-blowing fan when detecting leakage of the refrigerant, and to stop the air-blowing fan when a temporal change of the concentration of the leaked refrigerant is negative.

Further, according to one embodiment of the present invention, there is provided a refrigeration cycle apparatus, including: a refrigeration cycle configured to circulate refrigerant; a heat exchanger unit configured to accommodate at least a heat exchanger of the refrigeration cycle; and a controller configured to control the heat exchanger unit, in which: the heat exchanger unit includes a refrigerant detection unit configured to detect the refrigerant; the controller includes: a control board to which the refrigerant detection unit is unremovably connected; and a nonvolatile memory provided on the control board; the nonvolatile memory is provided with a leakage history storage area for storing any one of first information indicating a state of absence of refrigerant leakage history and second information indicating a state of presence of a refrigerant leakage history; information stored in the leakage history storage area is allowed to be changed from the first information to the second information only in one way; and the controller is configured to change the information stored in the leakage history storage area from the first information to the second information when detecting the leakage of the refrigerant.

Further, according to one embodiment of the present invention, there is provided a refrigeration cycle apparatus, including: a refrigeration cycle configured to circulate refrigerant; a heat exchanger unit configured to accommodate at least a heat exchanger of the refrigeration cycle; and a controller configured to control the heat exchanger unit, in which: the heat exchanger unit includes a refrigerant detection unit configured to detect the refrigerant; the controller includes: a control board to which the refrigerant detection unit is unremovably connected; and a nonvolatile memory provided on the control board; the nonvolatile memory is provided with a failure history storage area for storing any one of first information indicating a state of having no failure history in the refrigerant detection unit and second information indicating a state of having a failure history in the refrigerant detection unit; information stored in the failure history storage area is allowed to be changed from the first information to the second information only in one way; and the controller is configured to change the information stored in the failure history storage area from the first information to the second information when the refrigerant detection unit fails.

Further, according to one embodiment of the present invention, there is provided a refrigeration cycle system, including: a refrigeration cycle apparatus including: a refrigeration cycle configured to circulate refrigerant; and a controller configured to control the refrigeration cycle; an air-blowing fan controlled by the controller; and a refrigerant detection unit configured to detect a concentration of leaked refrigerant and to output a detection signal to the controller, in which the controller is configured to operate the air-blowing fan when detecting leakage of the refrigerant, and to stop the air-blowing fan triggered by becoming positive from negative of a temporal change of the concentration of the leaked refrigerant.

Further, according to one embodiment of the present invention, there is provided a refrigeration cycle system, including: a refrigeration cycle apparatus including: a refrigeration cycle configured to circulate refrigerant; and a controller configured to control the refrigeration cycle; an air-blowing fan controlled by the controller and a refrigerant detection unit configured to detect a concentration of leaked refrigerant and to output a detection signal to the controller, in which the controller is configured to operate the air-blowing fan when detecting leakage of the refrigerant, and to stop the air-blowing fan when a temporal change of the concentration of the leaked refrigerant is negative.

Further, according to one embodiment of the present invention, there is provided a refrigeration cycle system, including: a refrigeration cycle apparatus including: a refrigeration cycle configured to circulate refrigerant; and a controller configured to control the refrigeration cycle; and a refrigerant detection unit configured to detect the refrigerant, in which: the controller includes: a control board to which the refrigerant detection unit is unremovably connected; and a nonvolatile memory provided on the control board; the nonvolatile memory is provided with a leakage history storage area for storing any one of first information indicating a state of absence of refrigerant leakage history and second information indicating a state of presence of a refrigerant leakage history; information stored in the leakage history storage area is allowed to be changed from the first information to the second information only in one way; and the controller is configured to change the information stored in the leakage history storage area from the first information to the second information when detecting the leakage of the refrigerant.

Further, according to one embodiment of the present invention, there is provided a refrigeration cycle system, including: a refrigeration cycle apparatus including: a refrigeration cycle configured to circulate refrigerant; and a controller configured to control the refrigeration cycle; and a refrigerant detection unit configured to detect the refrigerant, in which: the controller includes: a control board to which the refrigerant detection unit is unremovably connected; and a nonvolatile memory provided on the control board; the nonvolatile memory is provided with a failure history storage area for storing any one of first information indicating a state of having no failure history in the refrigerant detection unit and second information indicating a state of having a failure history in the refrigerant detection unit; information stored in the failure history storage area is allowed to be changed from the first information to the second information only in one way; and the controller is configured to change the information stored in the failure history storage area from the first information to the second information when the refrigerant detection unit fails.

Advantageous Effects of Invention

According to one embodiment of the present invention, even if the refrigerant leaks, the leaked refrigerant can be diffused by the air-blowing fan, and hence it is possible to inhibit the refrigerant concentration from increasing locally. Further, the air-blowing fan can be stopped with a trigger that the refrigerant leakage no longer exists, and hence it is possible to prevent unnecessary energy from being consumed.

Further, according to one embodiment of the present invention, when the control board is replaced in order to reset the leakage history of the refrigerant, the refrigerant detection unit unremovably connected to the control board is also replaced, and hence it is possible to prevent the refrigerant detection unit having changed detection characteristics from being kept in continuous use.

Further, according to one embodiment of the present invention, when the control board is replaced in order to reset the failure history of the refrigerant detection unit, the refrigerant detection unit unremovably connected to the control board is also replaced, and hence it is possible to prevent the failed refrigerant detection unit from being kept in continuous use.

DESCRIPTION OF EMBODIMENTS

First Embodiment

Figure 1:
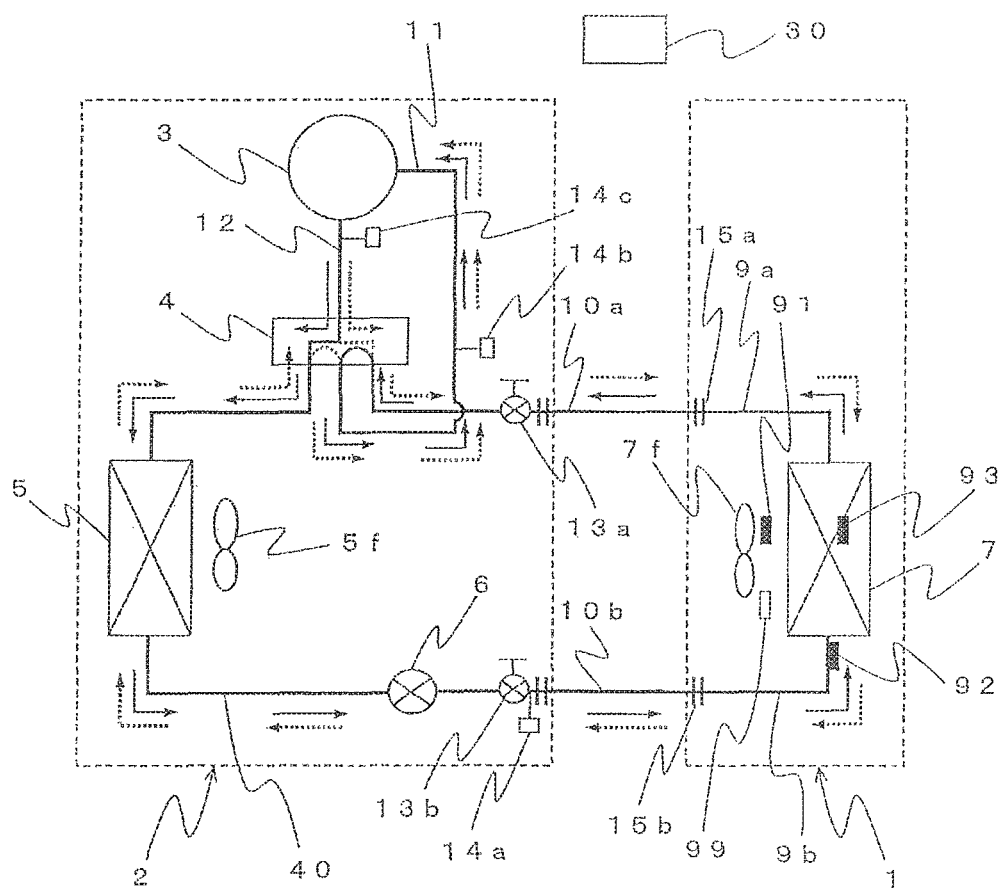
FIG. 1 is a refrigerant circuit diagram for illustrating a schematic configuration of a refrigeration cycle apparatus according to a first embodiment of the present invention.

A refrigeration cycle apparatus according to a first embodiment of the present invention is described. FIG. 1 is a refrigerant circuit diagram for illustrating a schematic configuration of the refrigeration cycle apparatus according to this embodiment. In this embodiment, a separate type air-conditioning apparatus is exemplified as the refrigeration cycle apparatus. Note that, in FIG. 1 and the subsequent figures, respective components may have a dimensional relationship, a shape, and the like, which are different from actual ones.

As illustrated in FIG. 1, the air-conditioning apparatus includes a refrigeration cycle 40 configured to circulate refrigerant. The refrigeration cycle 40 includes a compressor 3, a refrigerant flow switching device 4, a heat source-side heat exchanger 5 (for example, outdoor heat exchanger), a pressure reducing device 6, and a load-side heat exchanger 7 (for example, indoor heat exchanger), which are circularly connected sequentially through refrigerant pipes. Further, the air-conditioning apparatus includes an indoor unit 1 (example of a load unit and example of a heat exchanger unit), which is installed, for example, indoors and an outdoor unit 2 (example of a heat source unit), which is installed, for example, outdoors. The indoor unit 1 and the outdoor unit 2 are connected to each other through extension pipes 10a and 10b forming parts of the refrigerant pipes.

Examples of a refrigerant used as the refrigerant to be circulated by the refrigeration cycle 40 include a slightly flammable refrigerant, e.g., HFO-1234yf or HFO-1234ze and a strongly flammable refrigerant, e.g., R290 or R1270. Those refrigerants may be each used as a single refrigerant, or may be used as a mixed refrigerant obtained by mixing two or more kinds of the refrigerants with each other. In the following description, the refrigerant having a flammability equal to or higher than a slightly flammable level (for example, 2 L or higher in category of ASHRAE34) is sometimes referred to as "flammable refrigerant". Further, as the refrigerant to be circulated by the refrigeration cycle 40, a nonflammable refrigerant, e.g., R22 or R410A, having a nonflammability (for example, 1 in category of ASHRAE34) can be used. Those refrigerants have a density, for example, larger than that of air underan atmospheric pressure (for example, with the temperature being a room temperature (25 degrees Celsius)).

The compressor 3 is a fluid machine configured to compress a sucked low-pressure refrigerant and to discharge the low-pressure refrigerant as high-pressure refrigerant. The refrigerant flow switching device 4 is configured to switch a flow direction of the refrigerant within the refrigeration cycle 40 between a cooling operation time and a heating operation time. As the refrigerant flow switching device 4, for example, a four-way valve is used. The heat source-side heat exchanger 5 is a heat exchanger configured to serve as a radiator (for example, condenser) in the cooling operation and to serve as an evaporator in the heating operation. In the heat source-side heat exchanger 5, heat is exchanged between the refrigerant circulated through an inside of the heat source-side heat exchanger 5 and air (outdoor air) blown by an outdoor air-blowing fan 5$f$ described later. The pressure reducing device 6 is configured to reduce the pressure of the high-pressure refrigerant such that the high-pressure refrigerant becomes the low-pressure refrigerant. As the pressure reducing device 6, for example, an electronic expansion valve capable of adjusting its opening degree is used. The load-side heat exchanger 7 is a heat exchanger configured to serve as an evaporator in the cooling operation and to serve as a radiator (for example, condenser) in the heating operation. In the load-side heat exchanger 7, heat is exchanged between the refrigerant circulated through an inside of the load-side heat exchanger 7 and air blown by an indoor air-blowing fan 7$f$ described later. In this case, the cooling operation represents an operation for supplying low-temperature and low-pressure refrigerant to the load-side heat exchanger 7, and the heating operation represents an operation for supplying high-temperature and high-pressure refrigerant to the load-side heat exchanger 7.

The outdoor unit 2 accommodates the compressor 3, the refrigerant flow switching device 4, the heat source-side heat exchanger 5, and the pressure reducing device 6. Further, the outdoor unit 2 accommodates the outdoor air-blowing fan 5$f$ configured to supply outdoor air to the heat source-side heat exchanger 5. The outdoor air-blowing fan 5$f$ is installed so as to be opposed to the heat source-side heat exchanger 5. When the outdoor air-blowing fan 5$f$ is rotated, an airflow passing through the heat source-side heat exchanger 5 is generated. As the outdoor air-blowing fan 5$f$, for example, a propeller fan is used. The outdoor air-blowing fan 5$f$ is arranged on, for example, downstream of the heat source-side heat exchanger 5 along the airflow generated by the outdoor air-blowing fan 5$f$.

The refrigerant pipes arranged in the outdoor unit 2 include a refrigerant pipe configured to connect between a gas-side (cooling operation time) extension pipe connection valve 13$a$ and the refrigerant flow switching device 4, a suction pipe 11 connected to a suction side of the compressor 3, a discharge pipe 12 connected to a discharge side of the compressor 3, a refrigerant pipe configured to connect between the refrigerant flow switching device 4 and the heat source-side heat exchanger 5, a refrigerant pipe configured to connect between the heat source-side heat exchanger 5 and the pressure reducing device 6, and a refrigerant pipe configured to connect between the pressure reducing device 6 and a liquid-side (cooling operation time) extension pipe connection valve 13$b$. The extension pipe connection valve 13$a$ is formed of a two-way valve capable of switching between open and close, and has one end to which a flare joint is mounted. Further, the extension pipe connection valve 13$b$ is formed of a three-way valve capable of switching between open and close, and has one end to which a service port 14$a$ is mounted, which is used at a time of vacuuming (at a time of preliminary work of filling the refrigeration cycle 40 with refrigerant), and an other end to which a flare joint is mounted.

At both the cooling operation time and the heating operation time, high-temperature and high-pressure gas refrigerant compressed by the compressor 3 flows through the discharge pipe 12. At both the cooling operation time and the heating operation time, low-temperature and low-pressure refrigerant (gas refrigerant or two-phase refrigerant) subjected to an evaporation action flows through the suction pipe 11. The suction pipe 11 is connected to a low-pressure-side service port 14$b$ with a flare joint, and the discharge pipe 12 is connected to a high-pressure-side service port 14$c$ with a flare joint. The service ports 14$b$ and 14$c$ are used to connect a pressure gauge to measure the operating pressure at a time of installation of the air-conditioning apparatus or at a time of a trial run for a repair.

The indoor unit 1 accommodates the load-side heat exchanger 7. Further, the indoor air-blowing fan 7$f$ configured to supply air to the load-side heat exchanger 7 is installed in the indoor unit 1. When the indoor air-blowing fan 7$f$ is rotated, an airflow passing through the load-side heat exchanger 7 is generated. As the indoor air-blowing fan 7$f$, a centrifugal fan (for example, sirocco fan or turbofan), a cross flow fan, a mixed flow fan, an axial fan (for example, propeller fan), or other fans is used depending on a shape of the indoor unit 1. The indoor air-blowing fan 7$f$ according to this embodiment is arranged on upstream of the load-side heat exchanger 7 along the airflow generated by the indoor air-blowing fan 7$f$, but may be arranged on downstream of the load-side heat exchanger 7.

Of the refrigerant pipes of the indoor unit 1, a gas-side indoor pipe 9$a$ is provided in a connection portion to the gas-side extension pipe 10$a$ with a joint portion 15$a$ (for example, flare joint) for connection to the extension pipe 10$a$. Further, of the refrigerant pipes of the indoor unit 1, a liquid-side indoor pipe 9$b$ is provided in a connection portion to the liquid-side extension pipe 10$b$ with a joint portion 15$b$ (for example, flare joint) for connection to the extension pipe 10$b$.

Further, the indoor unit 1 includes a suction air temperature sensor 91 configured to detect a temperature of indoor air sucked from the indoors, a heat exchanger inlet temperature sensor 92 configured to detect a refrigerant temperature in a inlet in the cooling operation (outlet in the heating operation) of the load-side heat exchanger 7, and a heat exchanger temperature sensor 93 configured to detect a refrigerant temperature (evaporating temperature or condensing temperature) of a two-phase portion of the load-side heat exchanger 7. In addition, the indoor unit 1 includes a refrigerant detection unit 99 described later. Those sensors are configured to output a detection signal to a controller 30 configured to control an entirety of the indoor unit 1 or the air-conditioning apparatus.

The controller 30 includes a microcomputer including a CPU, a ROM, a RAM, and an I/O port. The controller 30 is configured to be able to conduct data communications to/from an operation unit 26 described later. The controller 30 according to this embodiment is configured to control the operation of the entirety of the indoor unit 1 or the air-conditioning apparatus including an operation of the indoor air-blowing fan 7$f$ based on an operation signal received from the operation unit 26, the detection signal received from the sensors, or other signals. The controller 30 may be provided inside a casing of the indoor unit 1, or may be provided inside a casing of the outdoor unit 2. Further, the controller 30 may include an outdoor unit controller provided to the outdoor unit 2 and an indoor unit controller that is provided to the indoor unit 1 and capable of conducting data communications to/from the outdoor unit controller.

Next, a description is made of the operation of the refrigeration cycle 40 of the air-conditioning apparatus. First, the operation in the cooling operation is described. In FIG. 1, the solid arrows indicate flow directions of the refrigerant in the cooling operation. The refrigerant circuit is configured so that, in the cooling operation, a refrigerant flow passage is switched by the refrigerant flow switching device 4 as indicated by the solid line, and the low-temperature and low-pressure refrigerant flows into the load-side heat exchanger 7.

The high-temperature and high-pressure gas refrigerant discharged from the compressor 3 first flows into the heat source-side heat exchanger 5 after passing through the refrigerant flow switching device 4. In the cooling operation, the heat source-side heat exchanger 5 serves as a condenser. That is, in the heat source-side heat exchanger 5, heat is exchanged between the refrigerant circulated through the inside of the heat-source side heat exchanger and the air (outdoor air) blown by the outdoor air-blowing fan 5f, and heat of condensation of the refrigerant is transferred to the blown air. With this operation, the refrigerant flowing into the heat source-side heat exchanger 5 is condensed to become high-pressure liquid refrigerant. The high-pressure liquid refrigerant flows into the pressure reducing device 6, and has the pressure reduced to become low-pressure two-phase refrigerant. The low-pressure two-phase refrigerant passes through the extension pipe 10b, and flows into the load-side heat exchanger 7 of the indoor unit 1. In the cooling operation, the load-side heat exchanger 7 serves as an evaporator. That is, in the load-side heat exchanger 7, heat is exchanged between the refrigerant circulated through the inside of the load-side heat exchanger and the air (indoor air) blown by the indoor air-blowing fan 7f, and heat of evaporation of the refrigerant is received from the blown air. With this operation, the refrigerant flowing into the load-side heat exchanger 7 evaporates to become low-pressure gas refrigerant or two-phase refrigerant. Further, the air blown by the indoor air-blowing fan 7f is cooled by a heat receiving action of the refrigerant. The low-pressure gas refrigerant or two-phase refrigerant evaporated by the load-side heat exchanger 7 passes through the extension pipe 10a and the refrigerant flow switching device 4, and is sucked by the compressor 3. The refrigerant sucked by the compressor 3 is compressed to become the high-temperature and high-pressure gas refrigerant. In the cooling operation, the above-mentioned cycle is repeated.

Next, the operation in the heating operation is described. In FIG. 1, the dotted arrows indicate flow directions of the refrigerant in the heating operation. The refrigerant circuit is configured so that, in the heating operation, the refrigerant flow passage is switched by the refrigerant flow switching device 4 as indicated by the dotted line, and the high-temperature and high-pressure refrigerant flows into the load-side heat exchanger 7. In the heating operation, the refrigerant flows in a direction reverse to that of the cooling operation, and the load-side heat exchanger 7 serves as a condenser. That is, in the load-side heat exchanger 7, heat is exchanged between the refrigerant circulated through the inside of the load-side heat exchanger 7 and the air blown by the indoor air-blowing fan 7f, and the heat of condensation of the refrigerant is transferred to the blown air. With this operation, the air blown by the indoor air-blowing fan 7f is heated by a heat transferring action of the refrigerant.

Figure 2:
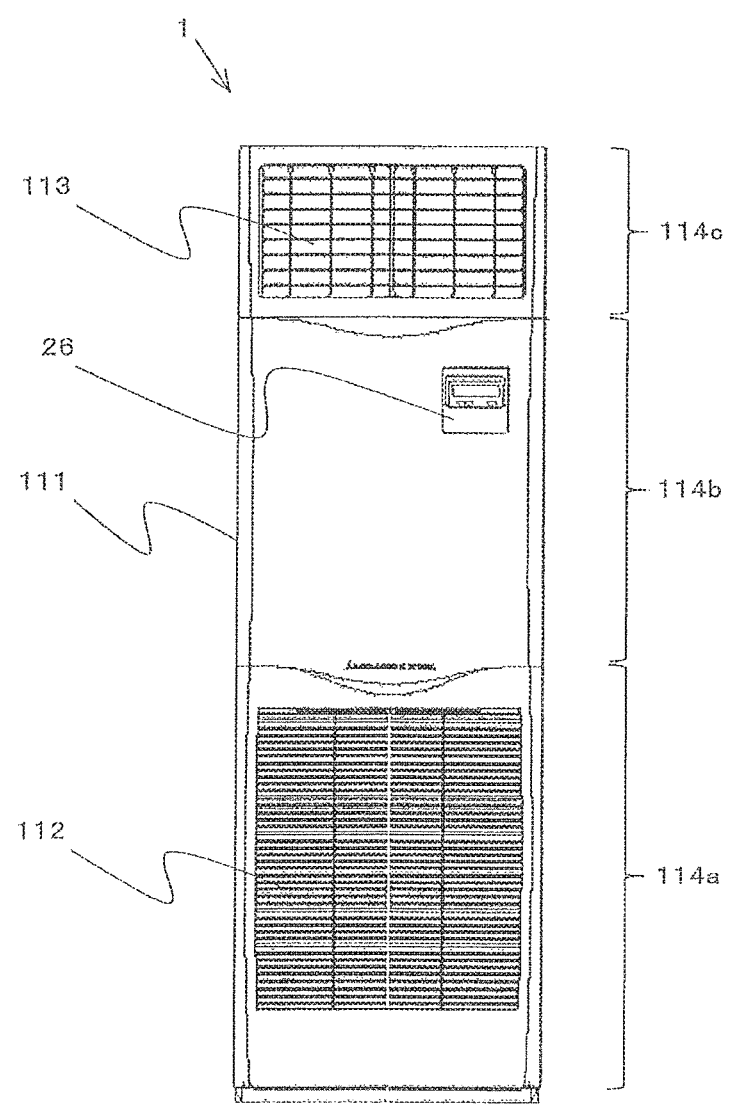
FIG. 2 is a front view for illustrating an external appearance configuration of an indoor unit 1 of the refrigeration cycle apparatus according to the first embodiment of the present invention.
Figure 3:
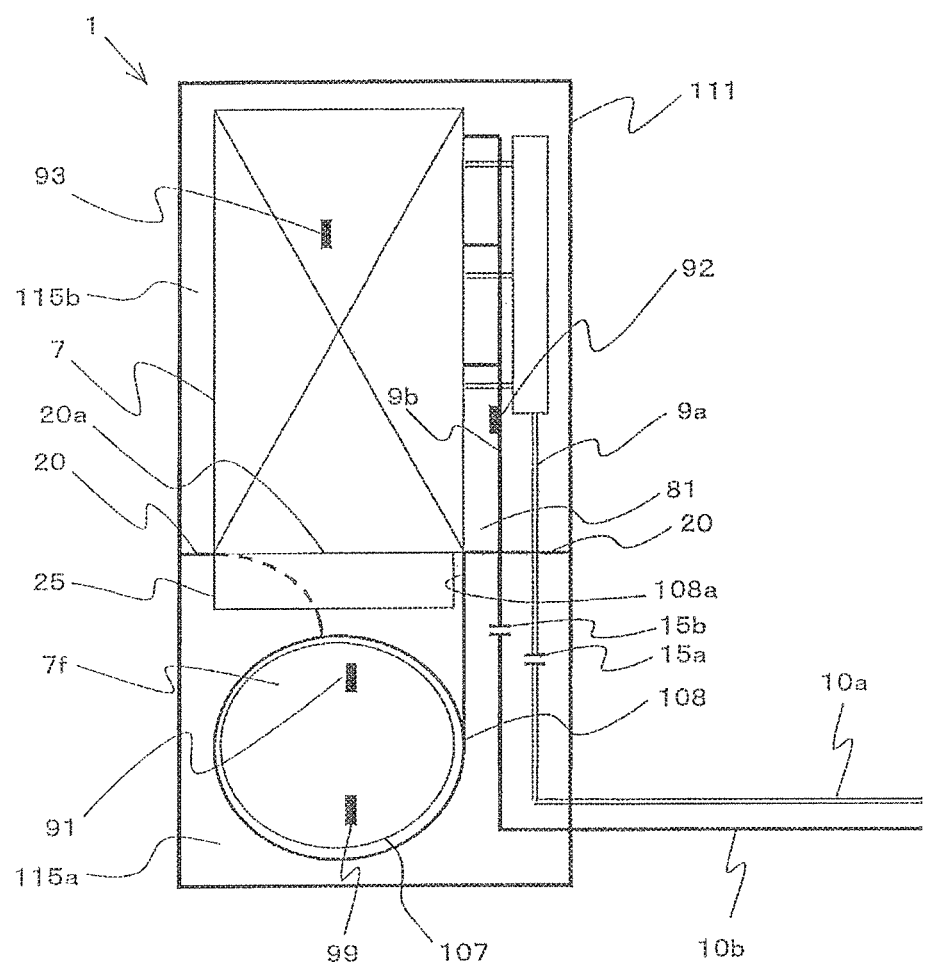
FIG. 3 is a front view for schematically illustrating an internal structure of the indoor unit 1 of the refrigeration cycle apparatus according to the first embodiment of the present invention.
Figure 4:
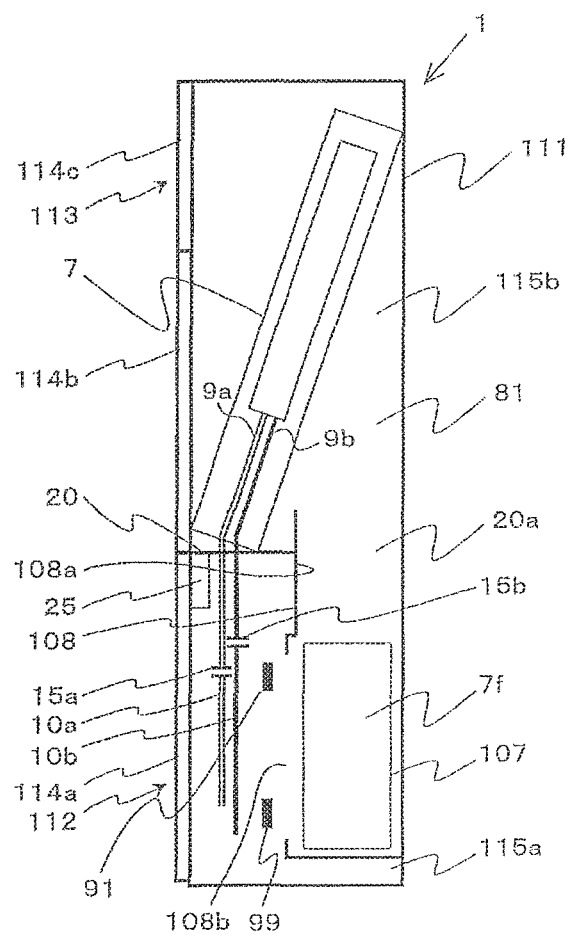
FIG. 4 is a side view for schematically illustrating the internal structure of the indoor unit 1 of the refrigeration cycle apparatus according to the first embodiment of the present invention.

FIG. 2 is a front view for illustrating an external appearance configuration of the indoor unit 1 of the air-conditioning apparatus according to this embodiment. FIG. 3 is a front view for schematically illustrating an internal structure of the indoor unit 1 (in a state in which a front panel is removed). FIG. 4 is a side view for schematically illustrating an internal structure of the indoor unit 1. The left of FIG. 4 indicates a front surface side (indoor space side) of the indoor unit 1. In this embodiment, as the indoor unit 1, the indoor unit 1 of a floor type, which is installed on a floor surface of an indoor space being an air-conditioning target space, is described as an example. In the following description, positional relationships (for example, top-bottom relationship) between respective components are, in principle, exhibited when the indoor unit 1 is installed in a usable state.

As illustrated in FIG. 2 to FIG. 4, the indoor unit 1 includes a casing 111 having an upright rectangular parallelepiped shape. An air inlet 112 configured to suck air inside the indoor space is formed in a lower portion of a front surface of the casing 111. The air inlet 112 according to this embodiment is provided in a position proximate to the floor surface below a center portion of the casing 111 in a vertical direction. An air outlet 113 configured to blow off the air sucked from the air inlet 112 indoors is formed in the upper portion of the front surface of the casing 111, that is, in a position higher than the air inlet 112 (for example, above the center portion of the casing 111 in the vertical direction). The operation unit 26 is provided to the front surface of the casing 111 above the air inlet 112 and below the air outlet 113. The operation unit 26 is connected to the controller 30 through a communication line, and is capable of conducting mutual data communications to/from the controller 30. As described above, in the operation unit 26, an operation start operation, an operation end operation, switching of operation modes, setting of a setting temperature and a setting airflow rate, and other operations are conducted for the indoor unit 1 (air-conditioning apparatus) based on a users operations. The operation unit 26 may include a display unit and an audio output unit that are configured to inform the user of information.

The casing 111 is a hollow box-like entity, and a front opening part is formed on a front surface of the casing 111. The casing 111 includes a first front panel 114a, a second front panel 114b, and a third front panel 114c, which are removably mounted to the front opening part. The first front panel 114a, the second front panel 114b, and the third front panel 114c all have a substantially rectangular flat outer shape. The first front panel 114a is removably mounted to a lower part of the front opening part of the casing 111. In the first front panel 114a, the air inlet 112 described above is formed. The second front panel 114b is arranged immediately above the first front panel 114a, and is removably mounted to a center part of the front opening part of the casing 111 in the vertical direction. In the second front panel 114b, the operation unit 26 described above is provided. The third front panel 114c is arranged immediately above the second front panel 114b, and is removably mounted to an upper part of the front opening part of the casing 111. In the third front panel 114c, the air outlet 113 described above is formed.

An internal space of the casing 111 is roughly divided into a space 115a being an air-blowing part and a space 115b being a heat-exchanging part located above the space 115a. The space 115a and the space 115b are partitioned by a partition portion 20. The partition portion 20 has, for example, a flat shape, and is arranged approximately horizontally. In the partition portion 20, at least an air passage opening part 20a is formed to serve as an air passage between the space 115a and the space 115b. The space 115a is defined to be exposed to the front surface side when the first front panel 114a is removed from the casing 111, and the space 115*b* is defined to be exposed to the front surface side when the second front panel 114*b* and the third front panel 114*c* are removed from the casing 111. That is, the partition portion 20 is mounted at approximately the same height as a height of an upper edge of the first front panel 114*a* (or lower edge of the second front panel 114*b*). In this case, the partition portion 20 may be formed integrally with a fan casing 108 described later, may be formed integrally with a drain pan described later, or may be formed separately from the fan casing 108 or the drain pan.

In the space 115*a*, the indoor air-blowing fan 7*f* configured to cause a flow of air from the air inlet 112 to the air outlet 113 is arranged. The indoor air-blowing fan 7*f* according to this embodiment is a sirocco fan including a motor (not shown) and an impeller 107 that is connected to an output shaft of the motor and has a plurality of blades arranged at regular intervals along a circumferential direction. A rotary shaft of the impeller 107 (output shaft of the motor) is arranged substantially in parallel with a depth direction of the casing 111. The impeller 107 of the indoor air-blowing fan 7*f* is covered with the fan casing 108 having a spiral shape. The fan casing 108 is formed, for example, separately from the casing 111. A suction opening 108*b* for sucking the indoor air through the air inlet 112 is formed near the center of a spiral of the fan casing 108. The suction opening 108*b* is located so as to be opposed to the air inlet 112. Further, an air outlet opening part 108*a* for blowing off the blown air is formed along a direction of a tangential line of the spiral of the fan casing 108. The air outlet opening part 108*a* is located so as to be directed upward, and is connected to the space 115*b* through the air passage opening part 20*a* of the partition portion 20. In other words, the air outlet opening part 108*a* communicates to/from the space 115*b* through the air passage opening part 20*a*. An opening end of the air outlet opening part 108*a* and an opening end of the air passage opening part 20*a* may be directly linked to each other, or may be indirectly linked to each other through a duct member or other members.

Further, in the space 115*a*, there is provided an electrical component box 25 accommodating, for example, a microcomputer that forms the controller 30 or other units, different kinds of electrical components, and a substrate.

The load-side heat exchanger 7 is arranged in an air passage 81 within the space 115*b*. The drain pan (not shown) configured to receive condensed water that is condensed on a surface of the load-side heat exchanger 7 is provided below the load-side heat exchanger 7. The drain pan may be formed as a part of the partition portion 20, or may be formed separately from the partition portion 20 to be arranged on the partition portion 20.

The refrigerant detection unit 99 is provided in a position near and below the vicinity of the suction opening 108*b*. As the refrigerant detection unit 99, a gas sensor, for example, a semiconductor gas sensor or a hot-wire type semiconductor gas sensor, is used. The refrigerant detection unit 99 is configured to detect, for example, a refrigerant concentration within the air around the refrigerant detection unit 99, and to output the detection signal to the controller 30. The controller 30 determines presence or absence of leakage of the refrigerant based on the detection signal received from the refrigerant detection unit 99.

In the indoor unit 1, a brazed portion of the load-side heat exchanger 7 and the joint portions 15*a* and 15*b* are liable to leak the refrigerant. Further, the refrigerant used in this embodiment has a destiny larger than the air under the atmospheric pressure. Hence, the refrigerant detection unit 99 according to this embodiment is provided in a position lower in height than the load-side heat exchanger 7 and the joint portions 15*a* and 15*b* within the casing 111. With this arrangement, the refrigerant detection unit 99 can reliably detect the leaked refrigerant at least when the indoor air-blowing fan 7*f* is stopped. In this embodiment, the refrigerant detection unit 99 is provided in the position below the suction opening 108*b*, but an arrangement position of the refrigerant detection unit 99 may be another position.

Figure 5:
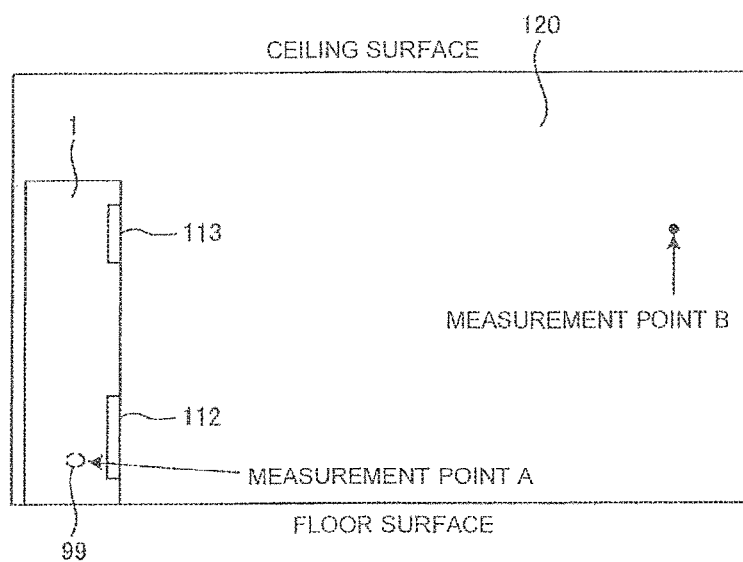
FIG. 5 is a diagram for illustrating an example of a state in which the indoor unit 1 of the refrigeration cycle apparatus according to the first embodiment of the present invention is installed in an indoor space 120.

Next, a description is made of how the refrigerant concentration changes when the refrigerant leakage occurs in the indoor unit 1. FIG. 5 is an illustration of an example of a state in which the indoor unit 1 is installed in an indoor space 120. In the state illustrated in FIG. 5, the refrigerant is intentionally leaked from the indoor unit 1 in a stopped state, and the refrigerant concentration was measured at a measurement point A inside the indoor unit 1 and near the arrangement position of the refrigerant detection unit 99 and a measurement point B distant from both the indoor unit 1 and the floor surface.

Figure 6:
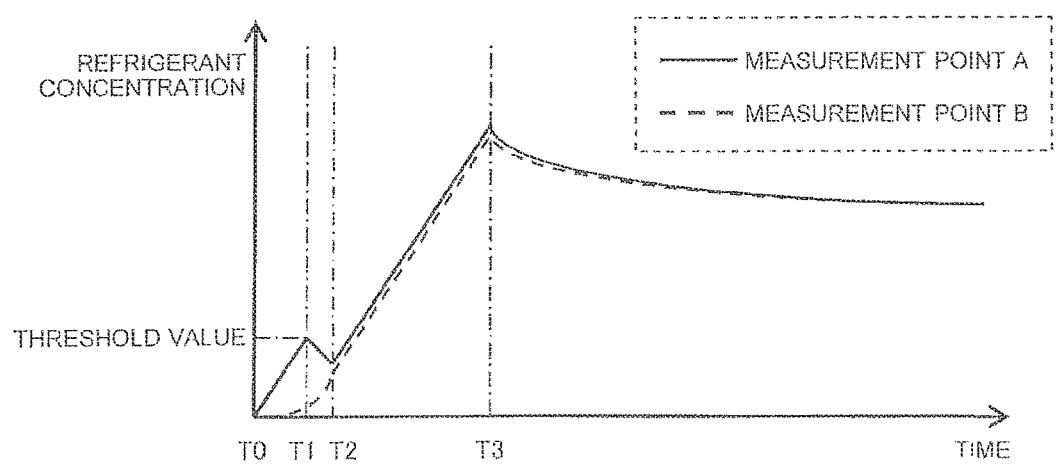
FIG. 6 is a graph for showing an example of a temporal change of a refrigerant concentration exhibited when refrigerant is leaked from the indoor unit 1 of the refrigeration cycle apparatus according to the first embodiment of the present invention.

FIG. 6 is a graph for showing an example of a temporal change of the refrigerant concentration exhibited when the refrigerant is leaked from the indoor unit 1. In the graph, the horizontal axis represents time, and the vertical axis represents the refrigerant concentration. The solid line indicates the temporal change of the refrigerant concentration at the measurement point A, and the broken line indicates the temporal change of the refrigerant concentration at the measurement point B. As shown in FIG. 6, when the refrigerant starts leaking from the indoor unit 1 at a time T0, the refrigerant concentration first rises at the measurement point A inside the indoor unit 1.

When the refrigerant concentration at the measurement point A (to be precise, refrigerant concentration detected by the refrigerant detection unit 99) reaches a threshold value set in advance (time T1 in FIG. 6), the indoor air-blowing fan 7*f* of the indoor unit 1 starts being operated as described later. With this operation, the air within the indoor space 120 is stirred to diffuse the refrigerant, and hence the refrigerant concentration at the measurement point A is temporarily lowered (from time T1 to time T2). However, the leakage of the refrigerant continues in the indoor unit 1, and hence the refrigerant concentration at the measurement point A starts increasing again at the time T2.

Meanwhile, the refrigerant concentration at the measurement point B distant from both the indoor unit 1 and the floor surface hardly changes immediately after the refrigerant starts leaking. However, the refrigerant concentration at the measurement point B steeply rises when the indoor air-blowing fan 7*f* starts being operated (from time T1 to time T2), and when a fixed time period has elapsed since operation start of the indoor air-blowing fan 7*f*, substantially matches with the refrigerant concentration at the measurement point A (time T2). That is, the refrigerant leaked from the indoor unit 1 is uniformly diffused to the entire indoor space 120 by a stirring effect due to the operation of the indoor air-blowing fan 7*f*. After the time T2, the refrigerant concentration rises while maintaining a substantially uniform state in the entire indoor space 120.

When the whole of the refrigerant has leaked from the indoor unit 1, or when a simple measure for stopping the refrigerant leakage is completed, the refrigerant stops leaking (time T3). When the refrigerant stops leaking, the refrigerant concentration stops increasing. Meanwhile, the refrigerant within the indoor space 120 starts leaking outdoors through gaps at the top and the bottom of a door due to natural ventilation. Therefore, after the refrigerant stops leaking, the refrigerant concentration within the entire indoor space 120 is gradually lowered irrespective of whether the indoor air-blowing fan 7f is operating or is stopped (after time T3). That is, after the refrigerant stops leaking, the refrigerant concentration can be gradually lowered even when the indoor air-blowing fan 7f is stopped. Hence, this embodiment is configured so that the indoor air-blowing fan 7f is stopped by being triggered by stop of the refrigerant stops leaking. This can prevent unnecessary energy from being consumed.

When the refrigerant stops leaking, the temporal change of the refrigerant concentration shifts from positive to negative. Therefore, it is possible to determine whether or not the refrigerant has stopped leaking based on whether or not the temporal change of the refrigerant concentration has shifted from positive to negative. In this case, the temporal change shifting from positive to negative includes not only a case where the temporal change shifts directly from positive to negative but also a case where the temporal change shifts from positive to negative via zero.

Figure 7:
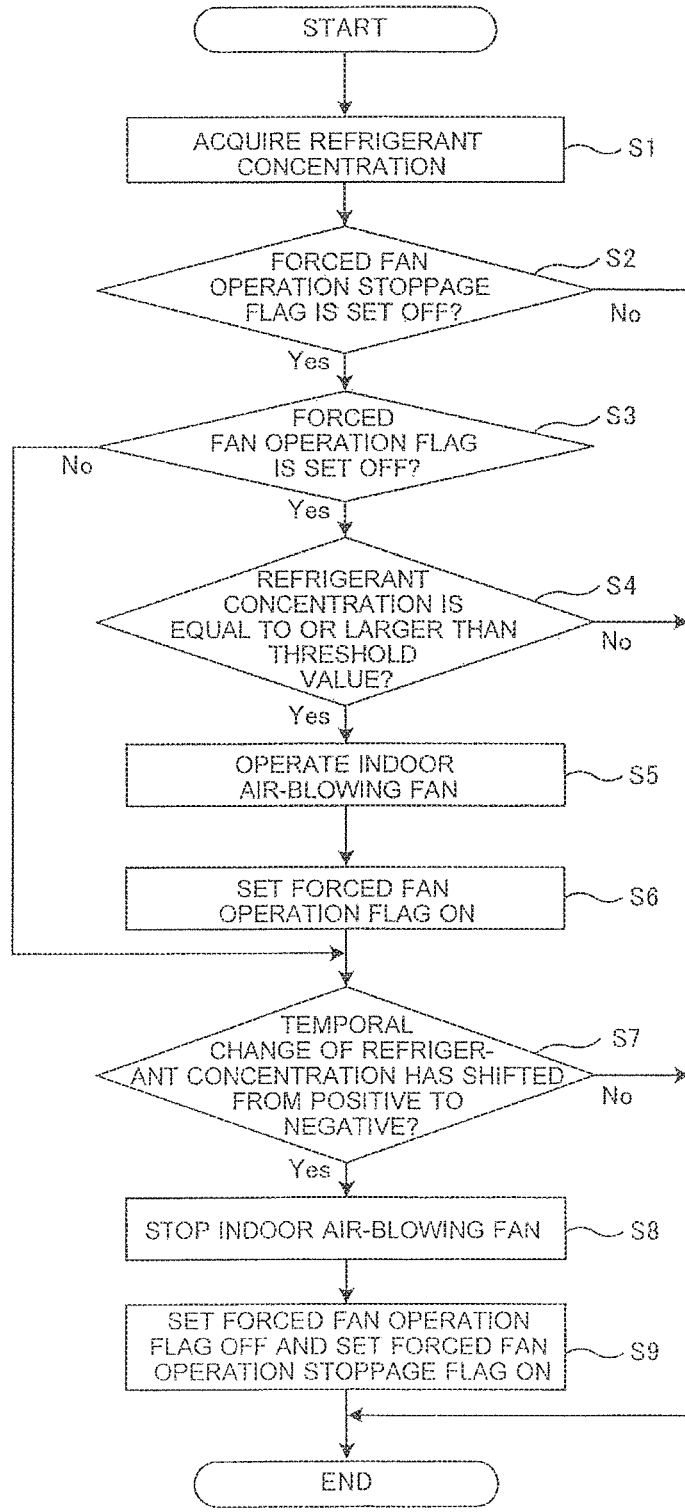
FIG. 7 is a flowchart for illustrating an example of a flow of refrigerant leakage detection processing executed by a controller 30 in the refrigeration cycle apparatus according to the first embodiment of the present invention.
Figure 8:
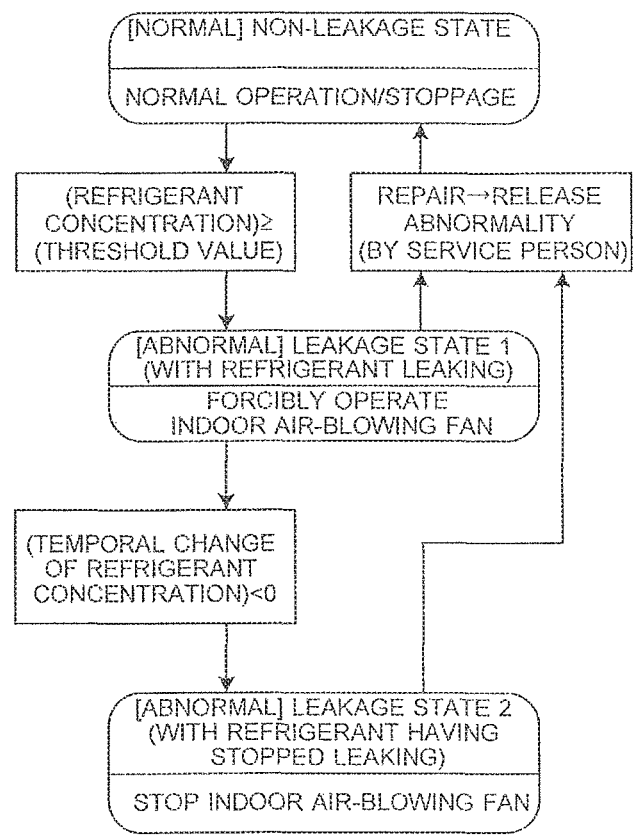
FIG. 8 is a state transition diagram for illustrating an example of a state transition of the refrigeration cycle apparatus according to the first embodiment of the present invention.

FIG. 7 is a flowchart for illustrating an example of a flow of refrigerant leakage detection processing (processing for operating and stopping the indoor air-blowing fan 7f) executed by the controller 30. The refrigerant leakage detection processing of FIG. 7 is executed repeatedly with a predetermined time interval at all times including while the air-conditioning apparatus is operating and is stopped or only while the air-conditioning apparatus is stopped. FIG. 8 is a state transition diagram for illustrating an example of a state transition of the air-conditioning apparatus.

First, it is assumed that the air-conditioning apparatus in an initial state is in a normal state (non-leaked state of FIG. 8) in which the leakage of the refrigerant has not occurred. Further, two flag areas of "forced fan operation flag" and "forced fan operation stoppage flag" are set in the RAM of the controller 30. In the initial state, the forced fan operation flag and the forced fan operation stoppage flag are both set off. The air-conditioning apparatus in the normal state conducts and stops the operation in a normal state based on the user's operation through the operation unit 26 (including a remote controller).

In Step S1 of FIG. 7, the controller 30 acquires information on the refrigerant concentration around the refrigerant detection unit 99 based on the detection signal received from the refrigerant detection unit 99.

Subsequently, in Step S2, the controller 30 determines whether or not the forced fan operation stoppage flag within the RAM is set off. When the forced fan operation stoppage flag is set off, the procedure advances to Step S3, and when the forced fan operation stoppage flag is set on, the processing is brought to an end.

In Step S3, the controller 30 determines whether or not the forced fan operation flag within the RAM is set off. When the forced fan operation flag is set off, the procedure advances to Step S4, and when the forced fan operation flag is set on, the procedure advances to Step S7.

In Step S4, the controller 30 determines whether or not the refrigerant concentration detected by the refrigerant detection unit 99 is equal to or larger than the threshold value set in advance. When the controller 30 determines that the refrigerant concentration is equal to or larger than the threshold value, the procedure advances to Step S5, and when the refrigerant concentration is smaller than the threshold value, the processing is brought to an end.

In Step S5, the controller 30 starts the operation of the indoor air-blowing fan 7f (corresponding to time T1 in FIG. 6). When the indoor air-blowing fan 7f is already operating, the operation is continued as it is. In Step S5, the display unit (liquid crystal screen, LED, or the like), the audio output unit, or other components provided to the operation unit 26 may be used to inform the user that the leakage of the refrigerant has occurred and to prompt the user to ask an expert service person for a repair.

Subsequently, in Step S6, the controller 30 sets the forced fan operation flag on. When the forced fan operation flag is set on, the state of the air-conditioning apparatus is set to a first abnormal condition (leaked state 1 (with the refrigerant leaking) of FIG. 8). After that, the procedure advances to Step S7.

In Step S7, the controller 30 determines whether or not the temporal change of the refrigerant concentration detected by the refrigerant detection unit 99 has shifted from positive to negative. When the controller 30 determines that the temporal change of the refrigerant concentration has shifted from positive to negative, the procedure advances to Step S8, and otherwise the processing is brought to an end. As shown in FIG. 6, the refrigerant concentration detected by the refrigerant detection unit 99 may be temporarily lowered immediately after startup of the indoor air-blowing fan 7f (from time T1 to time T2), and hence the processing may be brought to an end, instead of conducting the determination of Step S7, before a predetermined time period has elapsed since the startup of the indoor air-blowing fan 7f.

In Step S8, the controller 30 stops the indoor air-blowing fan 7f (corresponding to time T3 in FIG. 6). In this case, in consideration of a filling amount of the refrigerant for the refrigeration cycle 40, a capacity of the indoor space 120 in which the indoor unit 1 is installed, and other parameters, when there is a fear that the refrigerant concentration within the indoor space 120 may become equal to or larger than a permitted value (for example, lower limit combustion concentration LFL or oxygen deficiency permitted value), a step of determining whether or not the refrigerant concentration is smaller than the permitted value may be added after the positive determination of Step S7. Assuming that this step is added, when the controller 30 determines that the refrigerant concentration is smaller than the permitted value, the procedure advances to Step S8 to stop the indoor air-blowing fan 7f, and when the controller 30 determines that the refrigerant concentration is equal to or larger than the permitted value, the processing is brought to an end. With this processing, the operation of the indoor air-blowing fan 7f is continued until the refrigerant concentration becomes smaller than the permitted value, and hence safety of the air-conditioning apparatus can be further enhanced.

Subsequently, in Step S9, the controller 30 sets the forced fan operation flag off, and sets the forced fan operation stoppage flag on. When the forced fan operation stoppage flag is set on, the state of the air-conditioning apparatus is set to a second abnormal condition (leaked state 2 (with refrigerant having stopped leaking) of FIG. 8).

As described above, in the refrigerant leakage detection processing of FIG. 7, when the leakage of the refrigerant is detected (that is, when the refrigerant concentration detected by the refrigerant detection unit 99 is equal to or larger than the threshold value), the indoor air-blowing fan 7f starts being operated. Therefore, it is possible to diffuse the leaked refrigerant indoors. Further, the operation of the indoor air-blowing fan 7f is continued until the refrigerant stops leaking. Hence, even if the refrigerant leaks, it is possible to inhibit the refrigerant concentration from increasing locally indoors.

Further, in the refrigerant leakage detection processing of FIG. 7, it is possible to stop the indoor air-blowing fan 7f by being triggered by the stop of refrigerant leakage. Hence, it is possible to prevent unnecessary energy from being consumed. Further, the indoor air-blowing fan 7f continues to operate, to thereby be able to prevent the user from feeling needless anxiety. After the refrigerant stops leaking, an indoor refrigerant concentration is normally lowered gradually, and is not to increase again. Therefore, it is also possible to inhibit the refrigerant concentration from increasing locally indoors after the indoor air-blowing fan 7f is stopped.

Further, in the refrigerant leakage detection processing of FIG. 7, once the forced fan operation flag or the forced fan operation stoppage flag is set on, both the forced fan operation flag and the forced fan operation stoppage flag are not to be set off. Hence, as illustrated in FIG. 8, once the state of the air-conditioning apparatus is set to the leaked state 1 or the leaked state 2, the non-leaked state is not restored unless the service person repairs the air-conditioning apparatus and then releases an abnormality (sets the forced fan operation stoppage flag off).

In this embodiment, of the three states (non-leaked state, leaked state 1, and leaked state 2) illustrated in FIG. 8, only the non-leaked state allows a normal operation. In the leaked state 1 and the leaked state 2, the compressor 3 is in a state of forced stoppage (with startup being prohibited).

Further, in this embodiment, methods of releasing the abnormality are limited to methods that can be conducted only by an expert service person. This limitation can prevent the user from releasing the abnormality irrespective of an unfinished repair of the air-conditioning apparatus, and can guarantee the safety of the air-conditioning apparatus. The methods of releasing the abnormality are limited to, for example, the following four methods (1) to (4).
(1) Replenishment of, for example, a control board of the controller 30 (abnormality release through the replacement of the board is described later in a fifth embodiment of the present invention).
(2) Use of a dedicated checker.
(3) A special operation of the operation unit 26 (including a remote controller).
(4) An operation of the switch mounted on the control board of the controller 30.

In order to prevent the user from releasing the abnormality, it is desired that the abnormality can be released only by the methods (1) and (2), and it is further desired that the abnormality can be released only by the method (1).

As described above, the refrigeration cycle apparatus according to this embodiment includes: the refrigeration cycle 40 configured to circulate the refrigerant; the indoor unit 1 installed indoors and configured to accommodate at least the load-side heat exchanger 7 of the refrigeration cycle 40; and the controller 30 configured to control the indoor unit 1. The indoor unit 1 includes the indoor air-blowing fan 7f and the refrigerant detection unit 99 configured to detect a concentration of leaked refrigerant and to output the detection signal to the controller 30. The controller 30 is configured to operate the indoor air-blowing fan 7f when the leakage of the refrigerant is detected, and to stop the indoor air-blowing fan 7f by being triggered by becoming from positive to negative of the temporal change of the concentration of the leaked refrigerant.

According to this configuration, when the leakage of the refrigerant is detected, it is possible to diffuse the leaked refrigerant indoors by operating the indoor air-blowing fan 7f. Further, the operation of the indoor air-blowing fan 7f is continued until the refrigerant stops leaking. Hence, even if the refrigerant leaks, it is possible to inhibit the refrigerant concentration from increasing locally indoors. Further, according to this configuration, the indoor air-blowing fan 7f can be stopped by being triggered by the stop of the refrigerant leakage, and hence it is possible to prevent unnecessary energy from being consumed.

Second Embodiment

Figure 9:
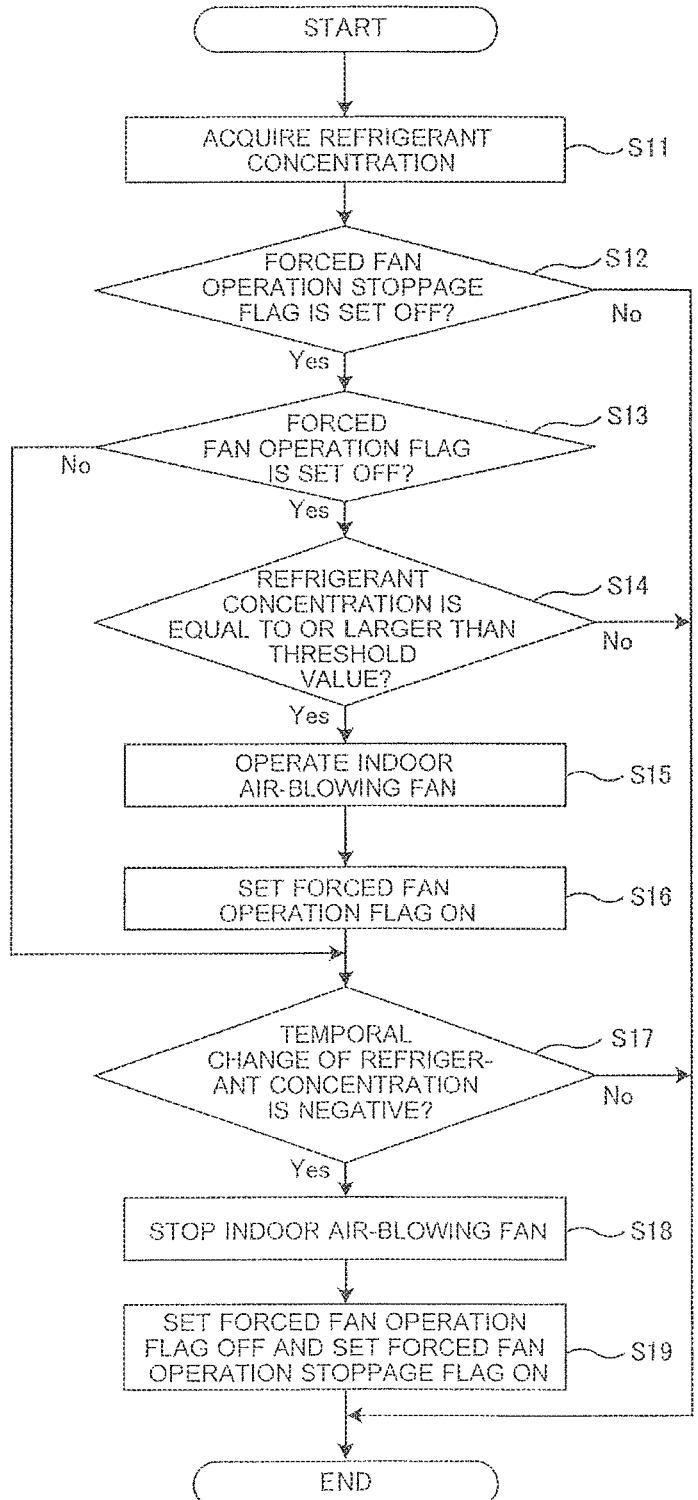
FIG. 9 is a flowchart for illustrating an example of a flow of refrigerant leakage detection processing executed by the controller 30 in a refrigeration cycle apparatus according to a second embodiment of the present invention.

A refrigeration cycle apparatus according to a second embodiment of the present invention is described. Note that, the refrigeration cycle apparatus according to this embodiment has the same configuration as that of the first embodiment, and hence a description thereof is omitted. FIG. 9 is a flowchart for illustrating an example of the flow of the refrigerant leakage detection processing executed by the controller 30 of the air-conditioning apparatus. The refrigerant leakage detection processing of FIG. 9 is executed repeatedly with a predetermined time interval at all times including while the air-conditioning apparatus is operating and is stopped or only while the air-conditioning apparatus is stopped. Steps S11 to S16, S18, and S19 of FIG. 9 are the same as Steps S1 to S6, S8, and S9 of FIG. 7, respectively.

In Step S17 of FIG. 9, the controller 30 determines whether or not the temporal change of the refrigerant concentration detected by the refrigerant detection unit 99 is negative (that is, whether or not the refrigerant concentration is decreasing). When the controller 30 determines that the temporal change of the refrigerant concentration is negative, the procedure advances to Step S18, and otherwise the processing is brought to an end. Note that, in the same manner as in Step S7 of FIG. 7, the processing may be brought to an end, instead of conducting the determination of Step S17, before the predetermined time period has elapsed since the startup of the indoor air-blowing fan 7f.

As described above, when the refrigerant stops leaking, the temporal change of the refrigerant concentration shifts from positive to negative. Therefore, it is possible to determine whether or not the refrigerant has stopped leaking also based on, as in this embodiment, whether or not the temporal change of the refrigerant concentration is negative.

As described above, the refrigeration cycle apparatus according to this embodiment includes: the refrigeration cycle 40 configured to circulate the refrigerant; the indoor unit 1 installed indoors and configured to accommodate at least the load-side heat exchanger 7 of the refrigeration cycle 40; and the controller 30 configured to control the indoor unit 1. The indoor unit 1 includes the indoor air-blowing fan 7f and the refrigerant detection unit 99 configured to detect a concentration of leaked refrigerant and to output the detection signal to the controller 30. The controller 30 is configured to operate the indoor air-blowing fan 7f when the leakage of the refrigerant is detected, and to stop the indoor air-blowing fan 7f when the temporal change of the concentration of the leaked refrigerant is negative.

According to this configuration, when the leakage of the refrigerant is detected, it is possible to diffuse the leaked refrigerant indoors by operating the indoor air-blowing fan 7f. Further, the operation of the indoor air-blowing fan 7f is continued until the refrigerant stops leaking. Hence, even if the refrigerant leaks, it is possible to inhibit the refrigerant concentration from increasing locally indoors. Further, according to this configuration, the indoor air-blowing fan 7f can be stopped with a trigger that the refrigerant stops leaking, and hence it is possible to prevent unnecessary energy from being consumed.

Third Embodiment

Figure 10:
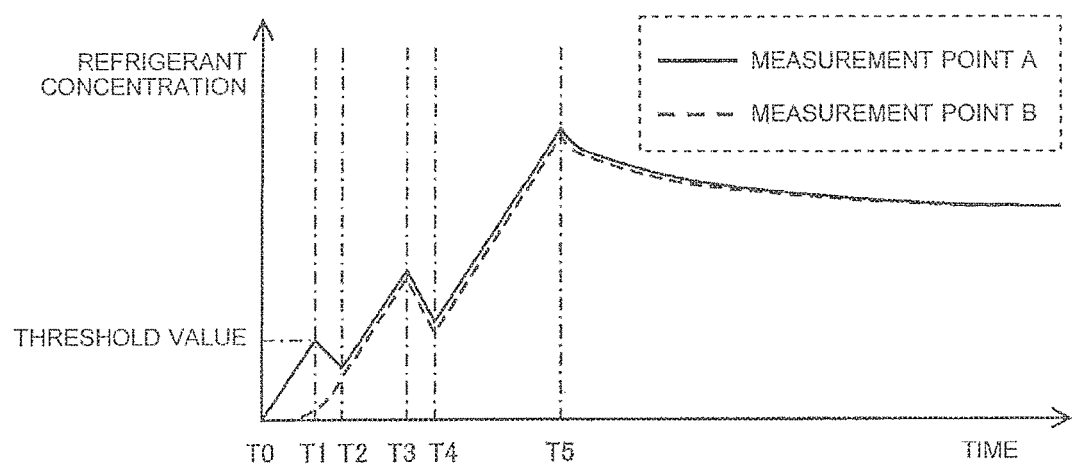
FIG. 10 is a graph for showing an example of a temporal change of a refrigerant concentration exhibited when refrigerant is leaked from the indoor unit 1 of a refrigeration cycle apparatus according to a third embodiment of the present invention.

Next, a refrigeration cycle apparatus according to a third embodiment of the present invention is described. Note that, the refrigeration cycle apparatus according to this embodiment has the same configuration as that of the first embodiment, and hence a description thereof is omitted. FIG. 10 is a graph for showing an example of the temporal change of the refrigerant concentration exhibited when the refrigerant is leaked from the indoor unit 1, and corresponds to FIG. 6. In the graph, the horizontal axis represents time, and the vertical axis represents the refrigerant concentration. The solid line indicates the temporal change of the refrigerant concentration at the measurement point A, and the broken line indicates the temporal change of the refrigerant concentration at the measurement point B.

As described above, when the leakage of the refrigerant is detected, the forced operation of the indoor air-blowing fan 7f is started, and the user is informed that the refrigerant leakage has occurred through the display unit, the audio output unit, or other units. When the forced operation of the indoor air-blowing fan 7f or the informing of the refrigerant leakage is executed suddenly, the user staying indoors may be surprised and go outdoors.

As shown in FIG. 10, when the door is opened while the refrigerant continues leaking, the refrigerant concentration is lowered once (from time T3 to time T4), and when the door is closed while the refrigerant continues leaking, the refrigerant concentration starts to increase again (from time T4 to time T5). After that, when the refrigerant stops leaking, the refrigerant concentration is gradually lowered (after time T5). In such a case, the temporal change of the refrigerant concentration shifts from positive to negative not only at a timing (time T5) at which the refrigerant leakage no longer exists but also at a timing (time T1) at which the indoor air-blowing fan 7f starts being operated and a timing (time T3) at which the door is opened during the refrigerant leakage. Hence, when the indoor air-blowing fan 7f is stopped with a trigger that the temporal change of the refrigerant concentration shifts from positive to negative (for example, in the first embodiment), there can be a fear that the indoor air-blowing fan 7f may be stopped before the refrigerant stops leaking.

In the same manner, the temporal change of the refrigerant concentration becomes negative not only during a period after the time T5 at which the refrigerant leakage no longer exists but also during the periods from the time T1 to the time T2 and from the time T3 to the time T4. Hence, when the indoor air-blowing fan 7f is stopped with the temporal change of the refrigerant concentration being negative (for example, in the second embodiment), there can be a fear in that the indoor air-blowing fan 7f may be stopped before the refrigerant stops leaking.

Therefore, this embodiment is configured so that, when the temporal change of the refrigerant concentration shifts from negative to positive (when the refrigerant concentration increases) after the indoor air-blowing fan 7f is stopped, the stopped indoor air-blowing fan 7f is operated again. In this case, the temporal change shifting from negative to positive includes not only a case where the temporal change shifts directly from negative to positive but also a case where the temporal change shifts from negative to positive via zero. Further, this embodiment may be configured so that, when the temporal change of the refrigerant concentration is positive after the indoor air-blowing fan 7f is stopped, the stopped indoor air-blowing fan 7f is operated again.

Figure 11:
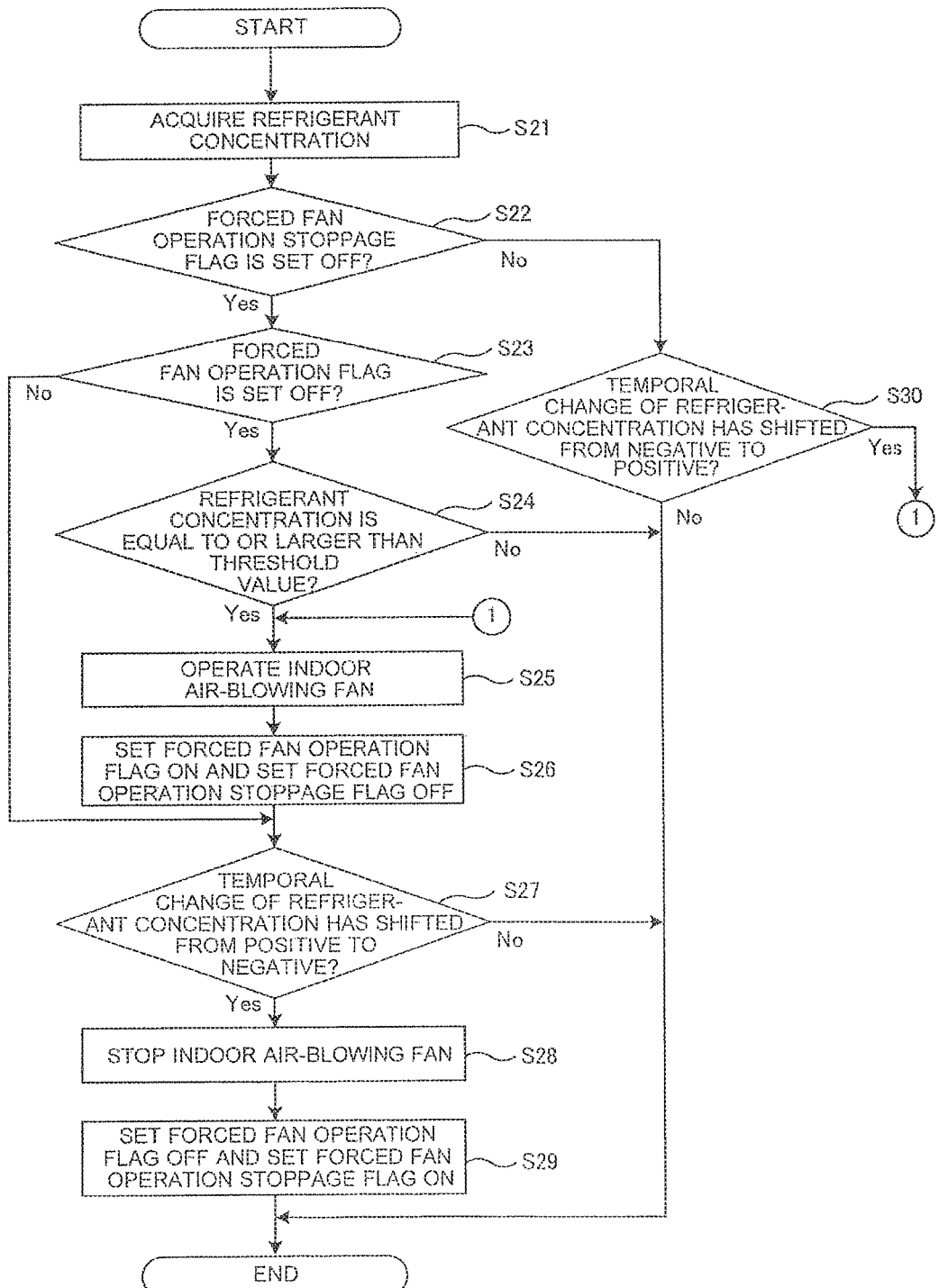
FIG. 11 is a flowchart for illustrating an example of a flow of refrigerant leakage detection processing executed by the controller 30 in the refrigeration cycle apparatus according to the third embodiment of the present invention.
Figure 12:
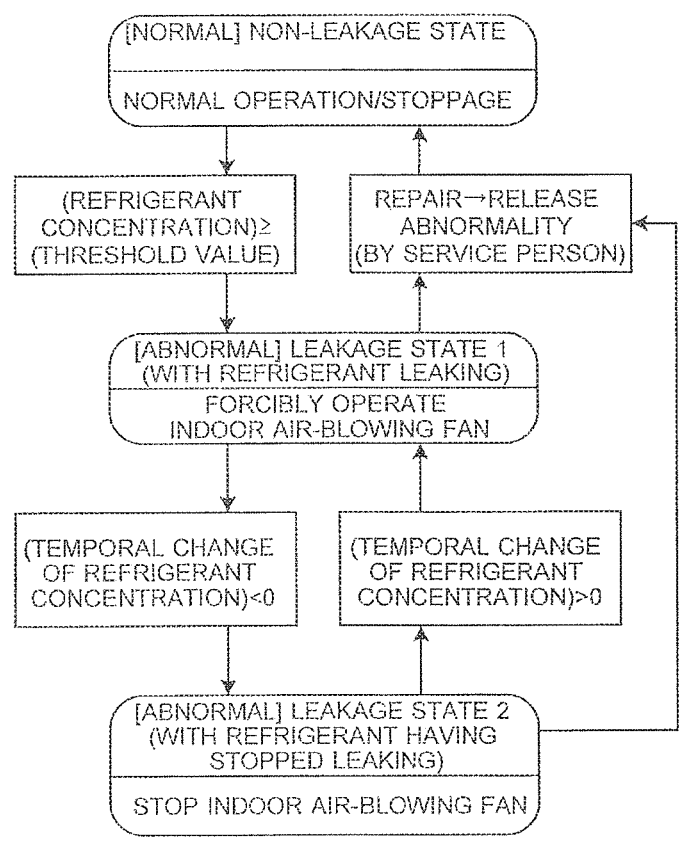
FIG. 12 is a state transition diagram for illustrating an example of a state transition of the refrigeration cycle apparatus according to the third embodiment of the present invention.

FIG. 11 is a flowchart for illustrating an example of the flow of the refrigerant leakage detection processing executed by the controller 30. The refrigerant leakage detection processing of FIG. 11 is executed repeatedly with a predetermined time interval at all times including while the air-conditioning apparatus is operating and is stopped or only while the air-conditioning apparatus is stopped. Steps S21 to S25 and S27 to S29 of FIG. 11 are the same as Steps S1 to S5 and S7 to S9 of FIG. 7, respectively. FIG. 12 is a state transition diagram for illustrating an example of a state transition of the air-conditioning apparatus.

In this embodiment, in the state in which the forced fan operation stoppage flag is set on (No in Step S22 of FIG. 11; the leaked state 2 of FIG. 12), it is determined whether or not the temporal change of the refrigerant concentration has shifted from negative to positive (Step S30 of FIG. 11). When it is determined in Step S30 that the temporal change of the refrigerant concentration has shifted from negative to positive, the procedure advances to Step S25 to restart the stopped operation of the indoor air-blowing fan 7f. After that, in Step S26, the forced fan operation stoppage flag is set off, the forced fan operation flag is set on. When the forced fan operation flag is set on, the state of the air-conditioning apparatus transitions from the leaked state 2 of FIG. 12 to the leaked state 1. Meanwhile, when it is determined in Step S30 that the temporal change of the refrigerant concentration remains negative or is zero, the processing is brought to an end.

As described above, in the refrigeration cycle apparatus according to this embodiment, the controller 30 may be configured to operate the stopped indoor air-blowing fan 7f again triggered by becoming positive from negative of a temporal change of the concentration of the leaked refrigerant.

Further, in the refrigeration cycle apparatus according to this embodiment, the controller 30 may be configured to operate the stopped indoor air-blowing fan 7f again when the temporal change of the concentration of the leaked refrigerant is positive.

According to those configurations, when the indoor air-blowing fan 7f is stopped before the refrigerant stops leaking, the stopped indoor air-blowing fan 7f can be operated again.

Fourth Embodiment

Next, a refrigeration cycle apparatus according to a fourth embodiment of the present invention is described. Note that, the refrigeration cycle apparatus according to this embodiment has the same configuration as that of the first embodiment, and hence a description thereof is omitted. As described above, when the indoor air-blowing fan 7f is stopped with a trigger that the temporal change of the refrigerant concentration shifts from positive to negative (for example, in the first embodiment), or when the indoor air-blowing fan 7f is stopped when the temporal change of the refrigerant concentration is negative (for example, in the second embodiment), there can be a fear that the indoor air-blowing fan 7f may be stopped before the refrigerant stops leaking.

Therefore, in this embodiment, as a condition for stopping the indoor air-blowing fan 7f, a condition that the state in which the temporal change of the refrigerant concentration is negative (decrease in the refrigerant concentration) is continued for equal to or longer than a threshold time period set in advance is added. The threshold time period is set to, for example, a time period (approximately several seconds to several minutes) longer than the period from the time T3 to the time T4 of FIG. 10.

Figure 13:
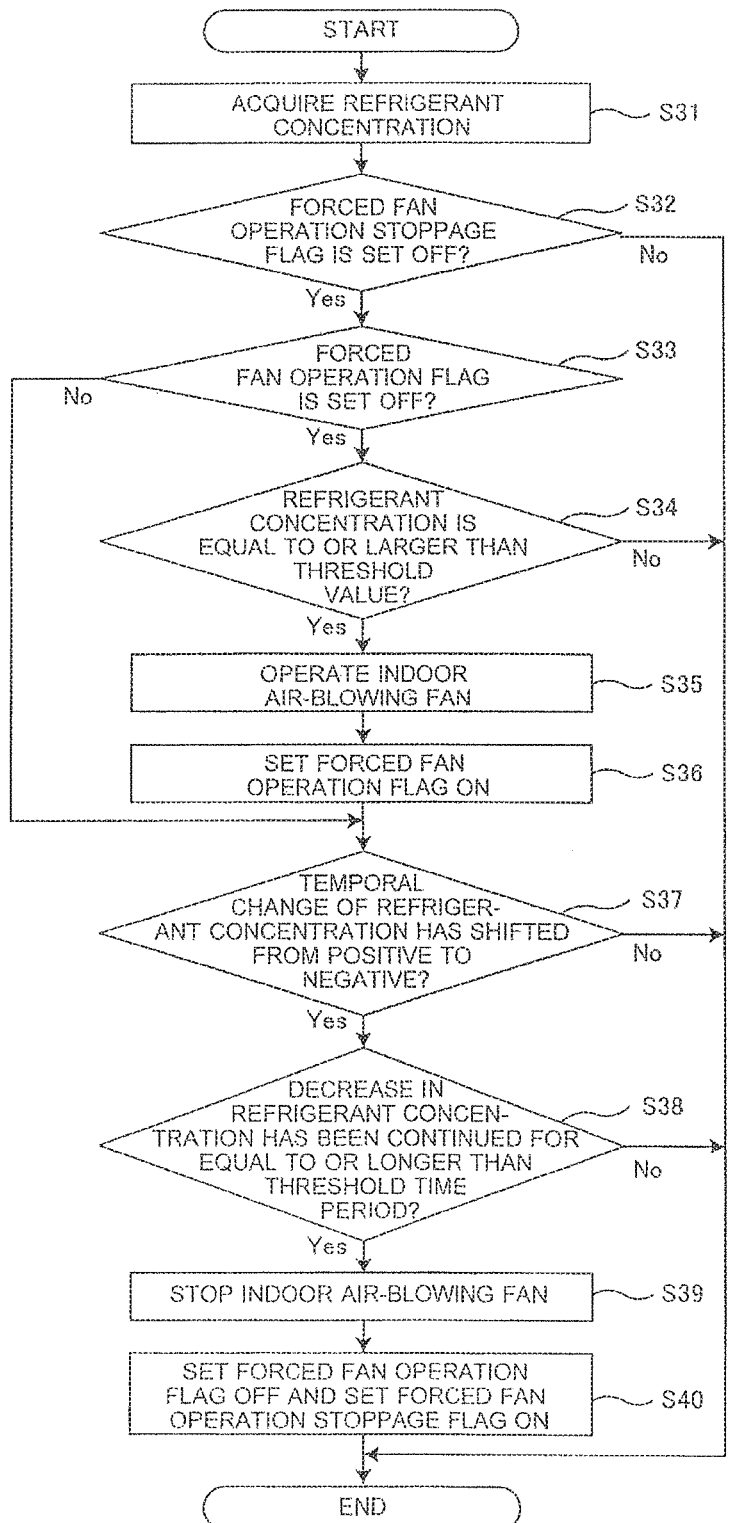
FIG. 13 is a flowchart for illustrating an example of a flow of refrigerant leakage detection processing executed by the controller 30 in a refrigeration cycle apparatus according to a fourth embodiment of the present invention.
Figure 14:
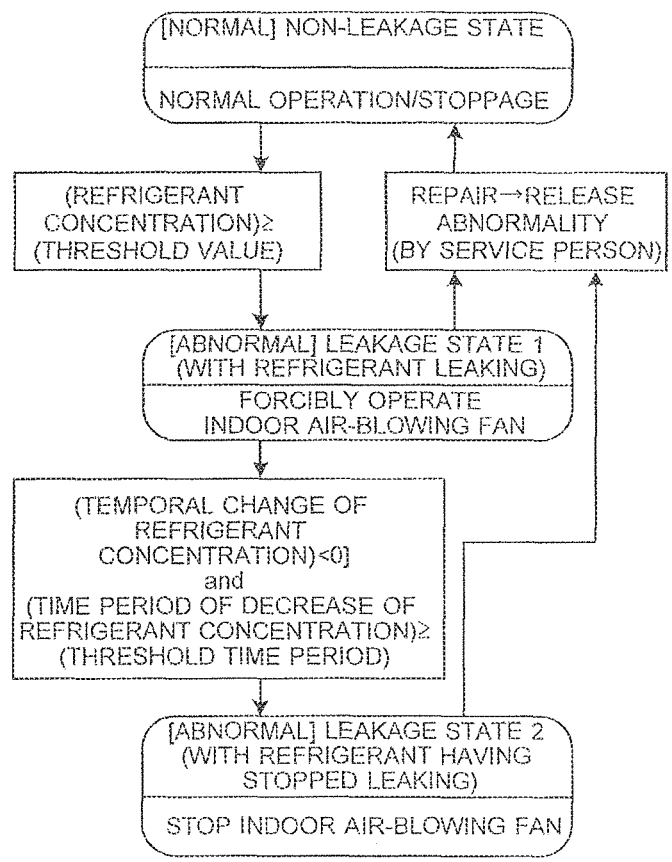
FIG. 14 is a state transition diagram for illustrating an example of a state transition of the refrigeration cycle apparatus according to the fourth embodiment of the present invention.

FIG. 13 is a flowchart for illustrating an example of the flow of the refrigerant leakage detection processing executed by the controller 30. The refrigerant leakage detection processing of FIG. 13 is executed repeatedly with a predetermined time interval at all times including while the air-conditioning apparatus is operating and is stopped or only while the air-conditioning apparatus is stopped. Steps S31 to S37, S39, and S40 of FIG. 13 are the same as Steps S1 to S9 of FIG. 7, respectively. FIG. 14 is a state transition diagram for illustrating an example of the state transition of the air-conditioning apparatus.

In this embodiment, in the state in which the forced fan operation flag is set on (Step S37 of FIG. 13; the leaked state 1 of FIG. 14), when the temporal change of the refrigerant concentration shifts from positive to negative (Yes in Step S37), the controller 30 further determines whether or not the decrease in the refrigerant concentration has been continued for equal to or longer than the threshold time period (Step S38). When it is determined in Step S38 that the decrease in the refrigerant concentration has been continued for equal to or longer than the threshold time period, the procedure advances to Step S39 to stop the indoor air-blowing fan 7f. After that, in Step S40, the forced fan operation flag is set off, and the forced fan operation stoppage flag is set on. When the forced fan operation stoppage flag is set on, the state of the air-conditioning apparatus is set to the leaked state 2 of FIG. 14. Meanwhile, when it is determined in Step S38 that the decrease in the refrigerant concentration has not been continued for equal to or longer than the threshold time period, the processing is brought to an end.

As described above, in the refrigeration cycle apparatus according to this embodiment, the controller 30 is configured to stop the indoor air-blowing fan 7f when the state in which the temporal change of the concentration of the leaked refrigerant is continued for equal to or longer than the threshold time period set in advance.

According to this configuration, it is possible to inhibit the indoor air-blowing fan 7f from being stopped before the refrigerant stops leaking.

Fifth Embodiment

Figure 15:
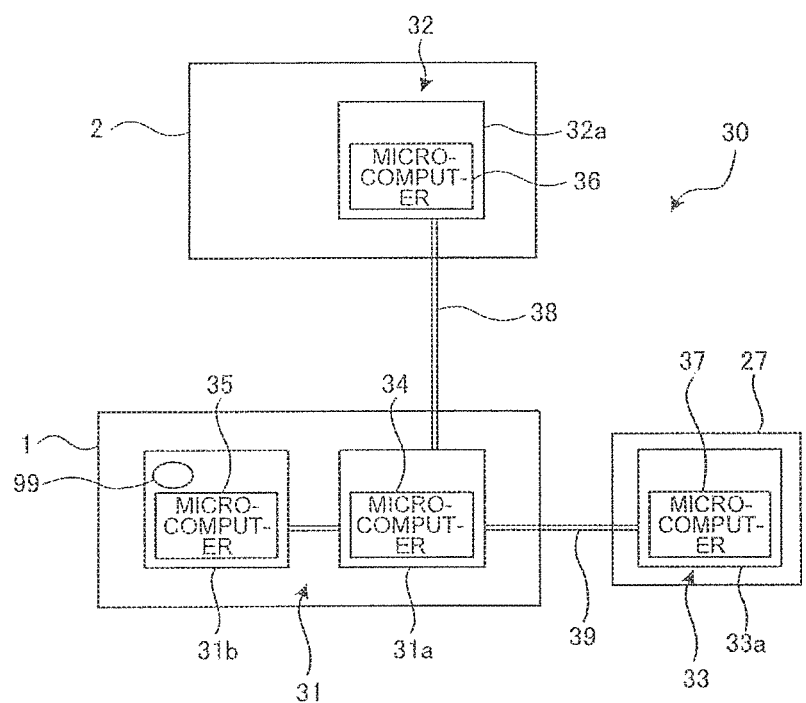
FIG. 15 is a block diagram for illustrating a configuration of the controller 30 of a refrigeration cycle apparatus according to a fifth embodiment and a sixth embodiment of the present invention.

Next, a refrigeration cycle apparatus according to a fifth embodiment of the present invention is described. The configuration of the refrigeration cycle apparatus according to this embodiment other than the controller is the same as that of the first embodiment, and hence a description thereof is omitted. FIG. 15 is a block diagram for illustrating the configuration of the controller 30 of the separate type air-conditioning apparatus. As illustrated in FIG. 15, the controller 30 includes an indoor unit controller 31 mounted to the indoor unit 1 and configured to control the indoor unit 1, an outdoor unit controller 32 mounted to the outdoor unit 2 and configured to control the outdoor unit 2, and a remote controller 33 mounted to a remote controller 27 (or operation unit 26) and configured to control the remote controller 27.

The indoor unit controller 31 includes a control board 31a and a control board 31b capable of communicating to/from the control board 31a through a control line. The indoor unit controller 31 is configured to communicate to/from the outdoor unit controller 32 and the remote controller 33. A microcomputer 34 is mounted on the control board 31a. A microcomputer 35 and the refrigerant detection unit 99 (for example, hot-wire type semiconductor gas sensor) are unremovably mounted on the control board 31b. The refrigerant detection unit 99 according to this embodiment is directly mounted on the control board 31b, but it suffices that the refrigerant detection unit 99 is unremovably connected to the control board 31b. For example, the refrigerant detection unit 99 may be provided in a position distant from the control board 31b, and a wiring extending from the refrigerant detection unit 99 may be connected to the control board 31b by soldering or other ways. Further, in this embodiment, the control board 31b is provided separately from the control board 31a, but the control board 31b may be omitted, and the refrigerant detection unit 99 may be unremovably connected to the control board 31a.

The outdoor unit controller 32 includes a control board 32a. A microcomputer 36 is mounted on the control board 32a.

The remote controller 33 includes a control board 33a. A microcomputer 37 is mounted on the control board 33a.

The indoor unit controller 31 and the outdoor unit controller 32 are communicably connected to each other through a control line 38. The indoor unit controller 31 and the remote controller 33 are communicably connected to each other through a control line 39.

The microcomputer 35 mounted on the control board 31b includes a rewritable nonvolatile memory (for example, flash memory). The nonvolatile memory is provided with a leakage history bit (example of a leakage history storage area) for storing a history of the refrigerant leakage. The leakage history bit of the microcomputer 35 can be set to "0" or "1". The leakage history bit has an initial value of "0". That is, in a case of the microcomputer 35 in brand-new conditions or the microcomputer 35 having no refrigerant leakage history, the leakage history bit is set to "0". The leakage history bit of the microcomputer 35 is rewritten from "0" to "1" when the refrigerant detection unit 99 detects the leakage of the refrigerant having a predetermined concentration (for example, concentration of ¼ of the lower limit combustion concentration LFL or threshold value for start operating the indoor air-blowing fan 7f). The leakage history bit of the microcomputer 35 can be rewritten from "0" to "1" irreversibly only in one way. Further, the leakage history bit of the microcomputer 35 is maintained irrespective of the presence or absence of electric power supply to the microcomputer 35. The leakage history bit according to this embodiment is provided so as to correspond to the forced fan operation flag or the forced fan operation stoppage flag according to the first to fourth embodiments described above.

Further, memories (nonvolatile memories or volatile memories) of the microcomputers 34, 36, and 37 are each provided with the leakage history bit corresponding to the leakage history bit of the microcomputer 35. The leakage history bits of the microcomputers 34, 36, and 37 can be set to "0" or "1". The leakage history bits of the microcomputers 34, 36, and 37 can be rewritten in both ways between "0" and "1". The leakage history bits of the microcomputers 34, 36, and 37 have values set to the same value as that of the leakage history bit of the microcomputer 35 acquired through communications. Even when returning to the initial value (for example, "0") due to an interruption of the electric power supply, the leakage history bits of the microcomputers 34, 36, and 37 are set to the same value as that of the leakage history bit of the microcomputer 35 again when the electric power supply is restarted.

When the leakage history bit of the microcomputer 34 is set to "0", the indoor unit controller 31 normally controls the indoor unit 1. The indoor unit 1 in this state conducts and stops the operation in a normal state based on the operation through the remote controller 27. Meanwhile, when the leakage history bit of the microcomputer 34 is set to "1", the indoor unit controller 31 conducts, for example, control for forcedly operating the indoor air-blowing fan 7f.

When the leakage history bit of the microcomputer 36 is set to "0", the outdoor unit controller 32 normally controls the outdoor unit 2. Meanwhile, when the leakage history bit of the microcomputer 36 is set to "1", the outdoor unit controller 32 conducts, for example, control for stopping the compressor 3. The stoppage of the compressor 3 is continued as long as the leakage history bit of the microcomputer 36 is set to "1".

When the leakage history bit of the microcomputer 37 is set to "0", the remote controller 33 normally controls the remote controller 27. Meanwhile, when the leakage history bit of the microcomputer 37 is set to "1", the remote controller controller 33 displays, for example, information including an abnormality type or an abnormality handling method (for example, text message, e.g., "Refrigerant leaking. Call service person." or abnormality code) on a display unit provided to the remote controller 27. This display is continued as long as the leakage history bit of the microcomputer 37 is set to "1". Further, the remote controller 33 may be configured to cause an audio output unit provided to the remote controller 27 to inform of the information including the abnormality type or the abnormality handling method by voice.

In such a configuration, when the leakage of the refrigerant is detected by the refrigerant detection unit 99, the microcomputer 35 rewrites the leakage history bit from the initial value "0" to "1" irreversibly. When the leakage history bit of the microcomputer 35 is set to "1", the leakage history bits of the microcomputers 34, 36, and 37 are also rewritten from "0" to "1". With this configuration, the forced operation of the indoor air-blowing fan 7f, the stoppage of the compressor 3, the displaying of the information on the display unit of the remote controller 27, and other operations are conducted.

The service person contacted by the user replaces the control board 31b by a brand-new one when a repair is conducted at a refrigerant leakage point. This is because the leakage history bits of the microcomputers 34, 36, and 37 are maintained at "1" by only conducting the repair at the refrigerant leakage point, and hence the normal operation of the air-conditioning apparatus cannot be conducted. The refrigerant detection unit 99 is unremovably connected to the control board 31b, and hence when the control board 31b is replaced, the refrigerant detection unit 99 is also replaced.

The leakage history bit of the microcomputer 35 mounted on the replaced control board 31b is set to "0" being the initial value. Hence, the leakage history bits of the microcomputers 34, 36, and 37 are also rewritten from "1" to "0". This allows the normal operation of the air-conditioning apparatus.

As described above, the refrigeration cycle apparatus according to this embodiment includes: the refrigeration cycle 40 configured to circulate the refrigerant; the indoor unit 1 installed indoors and configured to accommodate at least the load-side heat exchanger 7 of the refrigeration cycle 40; the outdoor unit 2 configured to accommodate at least the heat source-side heat exchanger 5 of the refrigeration cycle 40; the indoor unit controller 31 configured to control the indoor unit 1; and the outdoor unit controller 32 communicably connected to the indoor unit controller 31 and configured to control the outdoor unit 2. The indoor unit 1 includes the indoor air-blowing fan 7f and the refrigerant detection unit 99 configured to detect the refrigerant. The indoor unit controller 31 includes the control board (in this embodiment, control board 31b) to which the refrigerant detection unit 99 is unremovably connected, and the nonvolatile memory (in this embodiment, nonvolatile memory provided to the microcomputer 35) provided on the control board. The nonvolatile memory is provided with the leakage history bit that can be set to "0" being the initial value or "1", and the leakage history bit can be rewritten from "0" to "1" only in one way. The indoor unit controller 31 is configured to rewrite the leakage history bit from "0" to "1" when the leakage of the refrigerant is detected, and to operate the indoor air-blowing fan 7f. Further, the outdoor unit controller 32 may be configured to stop the compressor 3 when the leakage history bit is rewritten from "0" to "1".

According to this configuration, a leakage history of the refrigerant is written to the nonvolatile memory of the control board 31b irreversibly. In order to reset the leakage history of the refrigerant, the control board 31b needs to be replaced by another control board 31b having no leakage history. When the control board 31b is replaced, the refrigerant detection unit 99 unremovably connected to the control board 31b is also replaced. Hence, the refrigerant detection unit 99 exposed to a refrigerant atmosphere to have changed detection characteristics can be prevented from being kept in continuous use. Further, with this configuration, the operation of the air-conditioning apparatus cannot be restarted unless the control board 31b is replaced, and hence the operation of the air-conditioning apparatus that has not been repaired at the refrigerant leakage point can be prevented from being restarted due to a human error or intentionally.

Sixth Embodiment

A refrigeration cycle apparatus according to a sixth embodiment of the present invention is described with reference to FIG. 15 already referred to above. In this embodiment, the nonvolatile memory of the microcomputer 35 mounted on the control board 31b is provided with a failure bit (example of a failure history storage area) for storing a failure history (for example, presence or absence of a failure) of the refrigerant detection unit 99 in place of the leakage history bit described in the fifth embodiment or in addition to the leakage history bit. In the same manner as the leakage history bit, the failure bit can be set to "0" or "1", and has an initial value of "0". That is, in a case of the microcomputer 35 in the brand-new conditions or the microcomputer 35 having no failure history of the refrigerant detection unit 99, the failure bit is set to "0". When the refrigerant detection unit 99 fails (for example, when the microcomputer 35 detects a failure in the refrigerant detection unit 99 by a self-diagnosis), the failure bit of the microcomputer 35 is rewritten from "0" to "1". As in the leakage history bit, the failure bit of the microcomputer 35 can be rewritten from "0" to "1" irreversibly only in one way. Further, the failure bit of the microcomputer 35 is maintained irrespective of the presence or absence of the electric power supply to the microcomputer 35.

Further, the memories (nonvolatile memories or volatile memories) of the microcomputers 34, 36, and 37 are each provided with the failure bit corresponding to the failure bit of the microcomputer 35. The failure bits of the microcomputers 34, 36, and 37 can be set to "0" or "1". The failure bits of the microcomputers 34, 36, and 37 can be rewritten in both ways between "0" and "1". The failure bits of the microcomputers 34, 36, and 37 have values set to the same value as that of the failure bit of the microcomputer 35 acquired through communications. Even when returning to the initial value (for example, "0") due to an interruption of the electric power supply, the failure bits of the microcomputers 34, 36, and 37 are set to the same value as that of the failure bit of the microcomputer 35 again when the electric power supply is restarted.

In the same manner as in the fifth embodiment, when the failure bit is set to "0", the indoor unit controller 31, the outdoor unit controller 32, and the remote controller controller 33 normally control the indoor unit 1, the outdoor unit 2, and the remote controller 27, respectively. Meanwhile, when the failure bit is set to "1", the outdoor unit controller 32 and the remote controller 33 conduct, for example, control for the forced stoppage (disapproval of operation) of the compressor 3, and control for the displaying of the information on the display unit of the remote controller 27, respectively. In addition, the indoor unit controller 31 may conduct control for the forced operation of the indoor air-blowing fan 7f.

As described above, the refrigeration cycle apparatus according to this embodiment includes: the refrigeration cycle 40 configured to circulate the refrigerant; the indoor unit 1 installed indoors and configured to accommodate at least the load-side heat exchanger 7 of the refrigeration cycle 40; and the controller 30 (for example, indoor unit controller 31) configured to control the indoor unit 1. The indoor unit 1 includes the indoor air-blowing fan 7f and the refrigerant detection unit 99 configured to detect the refrigerant. The controller 30 includes the control board (in this embodiment, control board 31b) to which the refrigerant detection unit 99 is unremovably connected, and the nonvolatile memory (in this embodiment, nonvolatile memory provided to the microcomputer 35) provided on the control board. The nonvolatile memory is provided with the failure bit that can be set to "0" being the initial value or "1", and the failure bit can be rewritten from "0" to "1" only in one way. The controller 30 is configured to rewrite the failure bit from "0" to "1" when the refrigerant detection unit 99 fails.

According to this configuration, when the refrigerant detection unit 99 fails, the failure history of the refrigerant detection unit 99 is written to the nonvolatile memory of the control board 31b irreversibly. In order to reset the failure history of the refrigerant detection unit 99, the control board 31b needs to be replaced by another control board 31b. When the control board 31b is replaced, the refrigerant detection unit 99 unremovably connected to the control board 31b is also replaced. Hence, the failed refrigerant detection unit 99 can be prevented from being kept in continuous use. Further, with this configuration, the operation of the air-conditioning apparatus cannot be restarted unless the control board 31b is replaced, and hence the operation of the air-conditioning apparatus with the refrigerant detection unit 99 having failed can be prevented from being restarted due to a human error or intentionally. Therefore, it is possible to further enhance the safety of the air-conditioning apparatus.

Seventh Embodiment

Next, a refrigeration cycle apparatus according to a seventh embodiment of the present invention is described. In this embodiment, the refrigeration cycle apparatus is exemplified by a heat pump water heater. A configuration of the refrigeration cycle apparatus according to this embodiment is described below. A flow of processing executed by the controller in this embodiment is the same as that of the first embodiment (or any one of the second to sixth embodiments) described above, and hence a description thereof is omitted.

Figure 16:
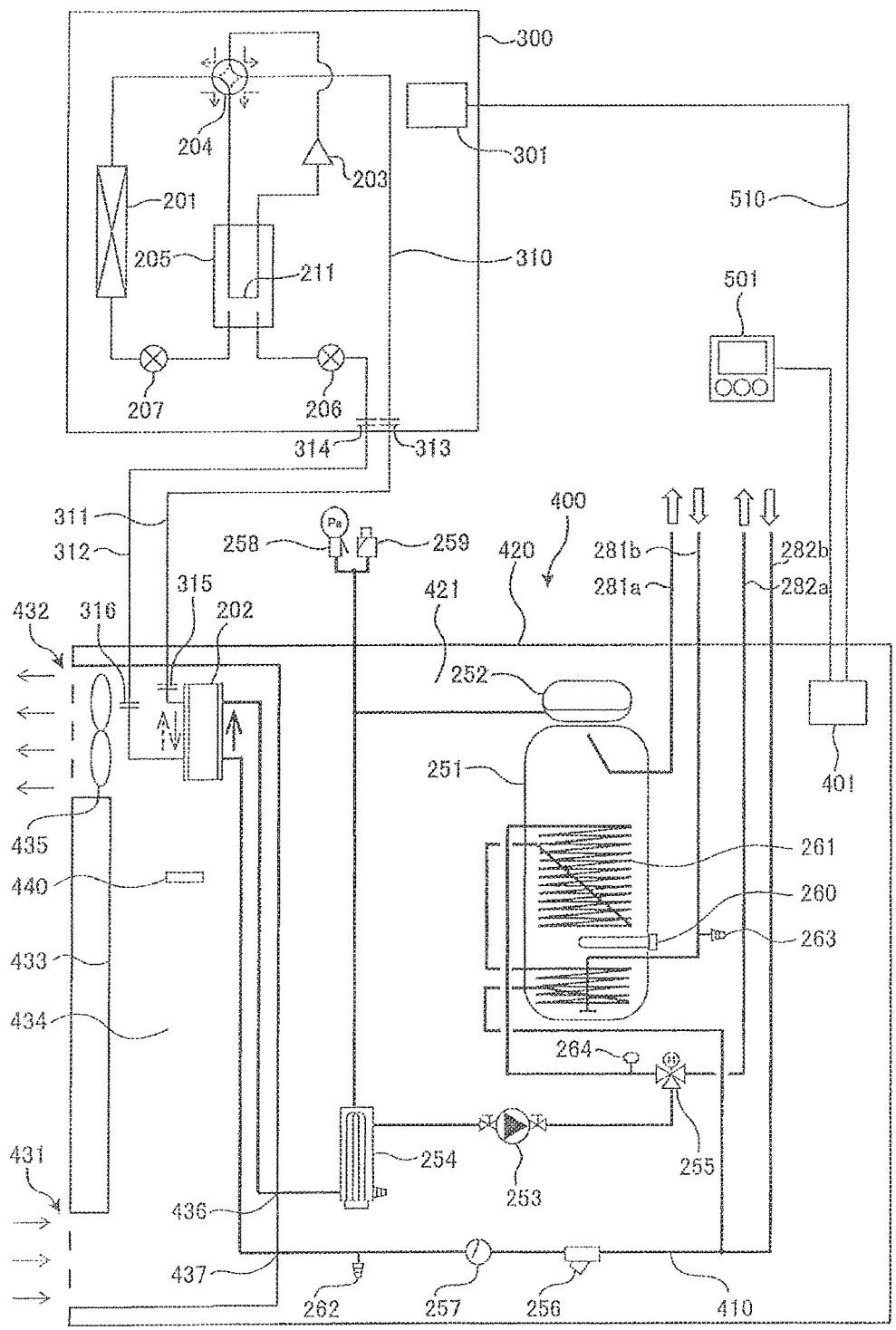
FIG. 16 is a refrigerant circuit diagram for illustrating a schematic configuration of a refrigeration cycle apparatus according to a seventh embodiment of the present invention.

FIG. 16 is a refrigerant circuit diagram for illustrating a schematic configuration of the refrigeration cycle apparatus according to this embodiment. As illustrated in FIG. 16, the heat pump water heater includes a refrigerant circuit 310 configured to circulate the refrigerant to form the refrigeration cycle and a water circuit 410 (example of a heat medium circuit) configured to circulate water (example of a heat medium). First, the refrigerant circuit 310 is described. The refrigerant circuit 310 includes a compressor 203, a refrigerant flow switching device 204, a load-side heat exchanger 202, a first pressure reducing device 206, an intermediate pressure receiver 205, a second pressure reducing device 207, and a heat source-side heat exchanger 201, which are circularly connected sequentially through the refrigerant pipes. The heat pump water heater is capable of a normal operation (heater water heating operation) for heating water flowing through the water circuit 410 and a defrosting operation for circulating the refrigerant reversely to the normal operation to defrost the heat source-side heat exchanger 201. Further, the heat pump water heater includes a load unit 400 (indoor unit; example of the heat exchanger unit) which is installed indoors and a heat source unit 300 (outdoor unit; example of the heat exchanger unit) which is installed, for example, outdoors. The load unit 400 is installed in, for example, a kitchen, a bathroom, a laundry room, or a storage space, e.g., a closet, inside a building.

As the refrigerant to be circulated through the refrigerant circuit 310, the flammable refrigerant or the nonflammable refrigerant described above is used.

The compressor 203 is a fluid machine configured to compress sucked low-pressure refrigerant and to discharge the low-pressure refrigerant as high-pressure refrigerant. The compressor 203 according to this embodiment includes an inverter device or other components, and is configured to change a driving frequency arbitrarily, to thereby be able to change a capacity (amount of the refrigerant to be sent per unit time).

The refrigerant flow switching device 204 is configured to switch the flow direction of the refrigerant inside the refrigerant circuit 310 between a normal operation time and a defrosting operation time. As the refrigerant flow switching device 204, for example, a four-way valve is used.

The load-side heat exchanger 202 is a refrigerant-water heat exchanger configured to exchange heat between the refrigerant flowing through the refrigerant circuit 310 and the water flowing through the water circuit 410. As the load-side heat exchanger 202, for example, a plate type heat exchanger (brazed plate type heat exchanger) structured so that a plurality of members are joined together by brazing is used. The load-side heat exchanger 202 serves as a condenser (radiator) configured to heat water at the normal operation time, and serves as an evaporator (heat absorber) at the defrosting operation time.

The first pressure reducing device 206 and the second pressure reducing device 207 are configured to adjust the flow rate of the refrigerant, and to adjust the pressure (reduce the pressure) of the refrigerant flowing into the load-side heat exchanger 202 or the heat source-side heat exchanger 201. The intermediate pressure receiver 205 is located between the first pressure reducing device 206 and the second pressure reducing device 207 in the refrigerant circuit 310, and is configured to accumulate an excess refrigerant. A suction pipe 211 connected to a suction side of the compressor 203 passes through the inside of the intermediate pressure receiver 205. In the intermediate pressure receiver 205, heat is exchanged between the refrigerant circulated through the suction pipe 211 and the refrigerant inside the intermediate pressure receiver 205. Therefore, the intermediate pressure receiver 205 has a function as an internal heat exchanger for the refrigerant circuit 310. As each of the first pressure reducing device 206 and the second pressure reducing device 207, for example, an electronic expansion valve capable of changing the opening degree by the control of a controller 301 described later is used.

The heat source-side heat exchanger 201 is a refrigerant-air heat exchanger configured to exchange heat between the refrigerant flowing through the refrigerant circuit 310 and air (outdoor air) blown by an outdoor air-blowing fan (not shown). The heat source-side heat exchanger 201 serves as an evaporator (heat absorber) at the normal operation time, and serves as a condenser (radiator) at the defrosting operation time.

The compressor 203, the refrigerant flow switching device 204, the first pressure reducing device 206, the intermediate pressure receiver 205, the second pressure reducing device 207, and the heat source-side heat exchanger 201 are accommodated in the heat source unit 300. The load-side heat exchanger 202 is accommodated in the load unit 400. The heat source unit 300 and the load unit 400 are connected to each other by, for example, two extension pipes 311 and 312 being parts of the refrigerant pipes. The extension pipes 311 and 312 and the refrigerant pipes inside the heat source unit 300 are connected to each other through joint portions 313 and 314 (for example, flare joints), respectively. The extension pipes 311 and 312 and the refrigerant pipes (for example, refrigerant pipes joined to the load-side heat exchanger 202 by brazing) inside the load unit 400 are connected to each other through joint portions 315 and 316 (for example, flare joints), respectively.

Further, the heat source unit 300 mainly includes the controller 301 configured to control an operation of the refrigerant circuit 310 (for example, the compressor 203, the refrigerant flow switching device 204, the first pressure reducing device 206, the second pressure reducing device 207, and the outdoor air-blowing fan (not shown)). The controller 301 includes a microcomputer including a CPU, a ROM, a RAM, and an I/O port. The controller 301 is configured to be able to conduct data communications to/from a controller 401 and an operation unit 501, which are described later, through a control line 510.

Next, an example of the operation of the refrigerant circuit 310 is described. In FIG. 16, the flow direction of the refrigerant in the refrigerant circuit 310 at the normal operation time is indicated by the solid arrows. The refrigerant circuit 310 is configured so that, at the normal operation time, the refrigerant flow passage is switched by the refrigerant flow switching device 204 as indicated by the solid line to cause the high-temperature and high-pressure refrigerant to flow into the load-side heat exchanger 202.

The high-temperature and high-pressure gas refrigerant discharged from the compressor 203 passes through the refrigerant flow switching device 204 and the extension pipe 311, and flows into the refrigerant flow passage of the load-side heat exchanger 202. At the normal operation time, the load-side heat exchanger 202 serves as a condenser. That is, in the load-side heat exchanger 202, heat is exchanged between the refrigerant flowing through the refrigerant flow passage and the water flowing through a water flow passage of the load-side heat exchanger 202, and the heat of condensation of the refrigerant is transferred to the water. With this operation, the refrigerant flowing into the load-side heat exchanger 202 is condensed to become a high-pressure liquid refrigerant. Further, the water flowing through the water flow passage of the load-side heat exchanger 202 is heated by transfer heat from the refrigerant.

The high-pressure liquid refrigerant condensed by the load-side heat exchanger 202 flows into the first pressure reducing device 206 through the extension pipe 312, and has the pressure reduced slightly to become a two-phase refrigerant. The two-phase refrigerant flows into the intermediate pressure receiver 205, and is cooled by the heat exchange with the low-pressure gas refrigerant flowing through the suction pipe 211 to become a liquid refrigerant. The liquid refrigerant flows into the second pressure reducing device 207, and has the pressure reduced to become a low-pressure two-phase refrigerant. The low-pressure two-phase refrigerant flows into the heat source-side heat exchanger 201. At the normal operation time, the heat source-side heat exchanger 201 serves as an evaporator. That is, in the heat source-side heat exchanger 201, heat is exchanged between the refrigerant circulated through the inside and the air (outdoor air) blown by the outdoor air-blowing fan, and the heat of evaporation of the refrigerant is received from the blown air. With this operation, the refrigerant flowing into the heat source-side heat exchanger 201 evaporates to become a low-pressure gas refrigerant. The low-pressure gas refrigerant passes through the refrigerant flow switching device 204, and flows into the suction pipe 211. The low-pressure gas refrigerant that has flowing into the suction pipe 211 is heated by the heat exchange with the refrigerant inside the intermediate pressure receiver 205, and is sucked by the compressor 203. The refrigerant sucked by the compressor 203 is compressed to become the high-temperature and high-pressure gas refrigerant. In the normal operation, the above-mentioned cycle is repeated.

Next, an example of the operation at the defrosting operation time is described. In FIG. 16, the flow direction of the refrigerant in the refrigerant circuit 310 at the defrosting operation time is indicated by the broken arrows. The refrigerant circuit 310 is configured so that, at the defrosting operation time, the refrigerant flow passage is switched by the refrigerant flow switching device 204 as indicated by the broken line to cause the high-temperature and high-pressure refrigerant to flow into the heat source-side heat exchanger 201.

The high-temperature and high-pressure gas refrigerant discharged from the compressor 203 passes through the refrigerant flow switching device 204, and flows into the heat source-side heat exchanger 201. At the defrosting operation time, the heat source-side heat exchanger 201 serves as a condenser. That is, in the heat source-side heat exchanger 201, heat is exchanged between the refrigerant circulated through the inside and frost adhering to a surface of the heat source-side heat exchanger 201. With this operation, the frost adhering to the surface of the heat source-side heat exchanger 201 is heated and melted by the heat of condensation of the refrigerant.

Next, the water circuit 410 is described. The water circuit 410 includes a hot-water storage tank 251, the load-side heat exchanger 202, a pump 253, a booster heater 254, a three-way valve 255, a strainer 256, a flow switch 257, a pressure relief valve 258, and an air purge valve 259, which are connected to one another through water pipes. A drain outlet 262 for draining the water from the inside of the water circuit 410 is provided halfway through the pipes that form the water circuit 410.

The hot-water storage tank 251 is a device configured to accumulate water in the inside. The hot-water storage tank 251 has a built-in coil 261 connected to the water circuit 410. The coil 261 is configured to exchange heat between the water (hot water) circulated through the water circuit 410 and the water accumulated inside the hot-water storage tank 251 to heat the water accumulated inside the hot-water storage tank 251. Further, the hot-water storage tank 251 has a built-in submerged heater 260. The submerged heater 260 is a heating unit configured to further heat the water accumulated inside the hot-water storage tank 251.

The water inside the hot-water storage tank 251 flows into a sanitary circuit-side pipe 281a (supply pipe) connected to, for example, a shower. Further, a drain outlet 263 is also provided to a sanitary circuit-side pipe 281b (return pipe). In this case, in order to prevent the water accumulated inside the hot-water storage tank 251 from being cooled by the outside air, the hot-water storage tank 251 is covered with a heat insulating material (not shown). Examples of the heat insulating material to be used include felt, Thinsulate (trademark), or a vacuum insulation panel (VIP).

The pump 253 is a device configured to apply pressure to the water inside the water circuit 410 to circulate the water through the inside of the water circuit 410. The booster heater 254 is a device configured to further heat the water inside the water circuit 410 when, for example, the heat source unit 300 has insufficient heating capacity. The three-way valve 255 is a device configured to cause the water inside the water circuit 410 to branch off. For example, the three-way valve 255 switches a destination to which the water inside the water circuit 410 is to be flowing between the hot-water storage tank 251 and a heater circuit-side pipe 282a (supply pipe) connected to heating equipment, e.g., a radiator or a floor heater, provided to the outside. In this case, the heater circuit-side pipe 282a (supply pipe) and a heater circuit-side pipe 282b (return pipe) are pipes for circulating the water between the water circuit 410 and the heating equipment. The strainer 256 is a device configured to remove scale (deposit) inside the water circuit 410. The flow switch 257 is a device configured to detect whether or not the flow rate of the water circulated through the inside of the water circuit 410 is equal to or larger than a fixed amount.

An expansion tank 252 is a device configured to control the pressure changed due to a capacity change of the water inside the water circuit 410 involved in the heating or other operations within a fixed range. The pressure relief valve 258 is a protective device. When the pressure of the water circuit 410 increases to exceed a pressure control range of the expansion tank 252, the water inside the water circuit 410 is released to the outside by the pressure relief valve 258. The air purge valve 259 is a device configured to release the air generated inside or mixed into the water circuit 410 to the outside, and to prevent the pump 253 from running idle (exhibiting air inclusion). A manual air purge valve 264 is a manual valve for removing air from the water circuit 410. The manual air purge valve 264 is used to remove, for example, air mixed into the water circuit 410 at a water filling time under installation work.

The water circuit 410 is accommodated inside a casing 420 of the load unit 400. Further, at least a part (for example, the hot-water storage tank 251, the pump 253, the booster heater 254, and the water pipes connected to those components) of the water circuit 410 accommodated inside the casing 420 is arranged in a water circuit chamber 421 (example of a heat medium circuit chamber) provided inside the casing 420. Meanwhile, at least the load-side heat exchanger 202 (for example, only the load-side heat exchanger 202 and the water pipes connected to the load-side heat exchanger 202) of the water circuit 410 is arranged in an air flow passage 434 described later. In short, the water circuit 410 is arranged inside the casing 420 across the water circuit chamber 421 and the air flow passage 434.

The load unit 400 includes the water circuit 410 (for example, the pump 253, the booster heater 254, and the three-way valve 255) and the controller 401 (example of the controller) configured to drive an operation of an air-blowing fan 435 described later or other devices. The controller 401 includes a microcomputer including a CPU, a ROM, a RAM, and an I/O port. The controller 401 is configured to be able to conduct data communications to/from the controller 301 and the operation unit 501.

The operation unit 501 is configured to allow the user to conduct the operation and different kinds of the settings of the heat pump water heater. The operation unit 501 according to this embodiment includes a display device, and is capable of displaying different kinds of information including a state of the heat pump water heater. For example, the operation unit 501 is provided on the front surface of the casing 420 of the load unit 400 at a height (for example, approximately 1.0 meter to 1.5 meters from the floor surface) that allows the user's operation with his/her hand (see FIG. 17).

Figure 17:
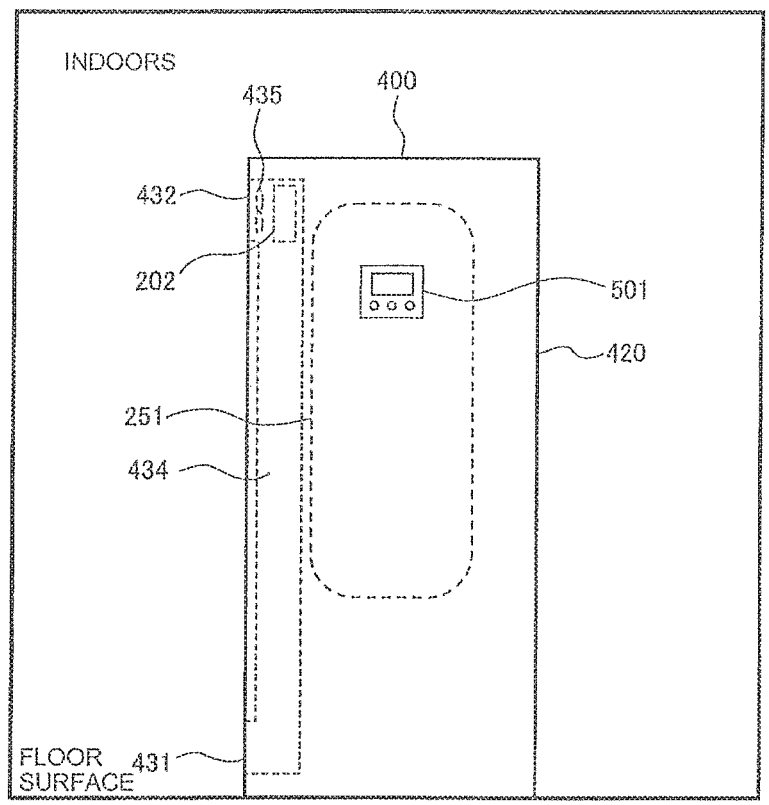
FIG. 17 is a front view for illustrating a configuration of a load unit 400 of the refrigeration cycle apparatus according to the seventh embodiment of the present invention.

Structural characteristics of the load unit 400 are described with reference to FIG. 17 in addition to FIG. 16. FIG. 17 is a front view for illustrating the configuration of the load unit 400. In FIG. 17, an example of a state in which the load unit 400 is installed indoors is also illustrated. As illustrated in FIG. 16 and FIG. 17, the load unit 400 according to this embodiment has a built-in hot-water storage tank 251, and is of a floor type installed on the floor surface of the indoors. The load unit 400 includes the casing 420 having an upright rectangular parallelepiped shape. The load unit 400 is installed such that, for example, a predetermined gap is formed between a back surface of the casing 420 and a wall surface of the indoors. The casing 420 is made of, for example, metal.

In the casing 420, an air inlet 431 for sucking indoor air and an air outlet 432 for blowing off the air sucked from the air inlet 431 indoors are formed. The air inlet 431 is provided in the lower portion of a side surface (in this embodiment, left side surface) of the casing 420. The air inlet 431 according to this embodiment is provided in a position lower than the operation unit 501 and near the floor surface of the indoors. The air outlet 432 is provided in the upper portion of the side surface (in this embodiment, left side surface) of the casing 420, that is, in the position higher than the air inlet 431. The air outlet 432 according to this embodiment is provided in a position higher than the operation unit 501 and near a top surface of the casing 420. The air outlet 432 is not provided with a device configured to open and close the air outlet 432. Therefore, in the air outlet 432, an air passage for circulating air is formed at all times.

In this case, the air inlet 431 may be provided to the front surface, a right side surface, or a back surface as long as the position is in the lower portion of the casing 420. The air outlet 432 may be provided to the top surface, the front surface, the right side surface, or the back surface as long as the position is in the upper portion of the casing 420.

In the casing 420, the air inlet 431 and the air outlet 432 are connected to each other through a duct 433 extending approximately in a vertical direction. The duct 433 is made of, for example, metal. In a space within the duct 433, the air flow passage 434 is formed to serve as a flow passage of air between the air inlet 431 and the air outlet 432. The air flow passage 434 is isolated from the water circuit chamber 421 by the duct 433. At least a part of the water circuit 410 is arranged in the water circuit chamber 421, and the load-side heat exchanger 202 is arranged in the air flow passage 434. Therefore, in the duct 433, penetration parts 436 and 437 that allow the water pipes of the water circuit 410 to penetrate the duct 433 are formed. The air flow passage 434 has a smaller number of accommodated components than that of the water circuit chamber 421, and can therefore have the shape simplified and the capacity reduced with ease.

In the casing 420, the air flow passage 434 and the water circuit chamber 421 are isolated from each other by the duct 433, for example, airtightly. With this configuration, the duct 433 inhibits gas from flowing between the air flow passage 434 and the water circuit chamber 421. The airtightness of the duct 433 is ensured even at the penetration parts 436 and 437. However, the air flow passage 434 communicates to/from a space outside the casing 420 through the air inlet 431 and the air outlet 432, and the water circuit chamber 421 is not always enclosed against the space outside the casing 420. Hence, the air flow passage 434 and the water circuit chamber 421 are not always isolated from each other airtightly through the space outside the casing 420.

In the air flow passage 434 according to this embodiment, not only the load-side heat exchanger 202 but also the joint portions 315 and 316 for connecting between the load-side heat exchanger 202 and the extension pipes 311 and 312 are arranged. In this embodiment, a large part (for example, all) of component parts of the refrigerant circuit 310 accommodated inside the load unit 400 is arranged in the air flow passage 434. With this configuration, the air flow passage 434 also serves as a refrigerant circuit chamber inside the casing 420 of the load unit 400. The load-side heat exchanger 202 and the joint portions 315 and 316 are arranged in the upper portion of the air flow passage 434 (for example, above a middle portion between the upper edge and the lower edge of the air flow passage 434 (in this embodiment, on the air outlet 432 side of the middle portion)).

Further, the air flow passage 434 includes the air-blowing fan 435 configured to generate a flow of air from the air inlet 431 to the air outlet 432 in the air flow passage 434. As the air-blowing fan 435, a cross flow fan, a turbofan, a sirocco fan, a propeller fan, or other fans is used. The air-blowing fan 435 according to this embodiment is arranged so as to be opposed to, for example, the air outlet 432. An operation of the air-blowing fan 435 is controlled by, for example, the controller 401.

In the air flow passage 434, a refrigerant detection unit 440 configured to detect the leakage of the refrigerant is provided below the load-side heat exchanger 202. The refrigerant detection unit 440 according to this embodiment is provided below the joint portions 315 and 316. The refrigerant detection unit 440 is configured to detect, for example, the refrigerant concentration within the air around the refrigerant detection unit 440, and to output the detection signal to the controller 401. The controller 401 is configured to determine the presence or absence of the leakage of the refrigerant based on the detection signal received from the refrigerant detection unit 440. As the refrigerant detection unit 440, a gas sensor (for example, semiconductor gas sensor or hot-wire type semiconductor gas sensor) is used.

Eighth Embodiment

Figure 18:
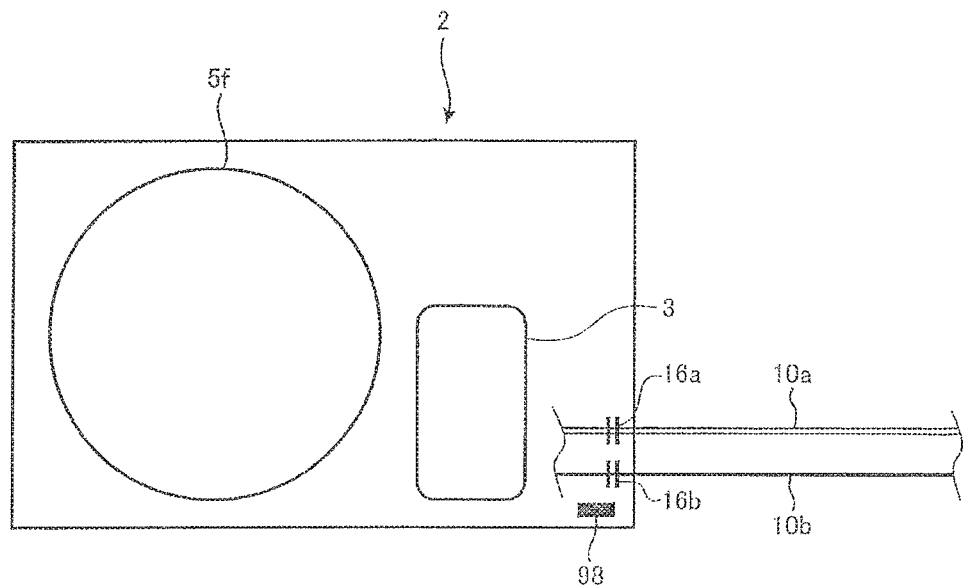
FIG. 18 is a diagram for schematically illustrating a configuration of an outdoor unit 2 of a refrigeration cycle apparatus according to an eighth embodiment of the present invention.

Next, a refrigeration cycle apparatus according to an eighth embodiment of the present invention is described. FIG. 18 is a diagram for schematically illustrating the configuration of the outdoor unit 2 of the refrigeration cycle apparatus according to the eighth embodiment. As already described above, the outdoor unit 2 accommodates, for example, the compressor 3, the refrigerant flow switching device 4, the heat source-side heat exchanger 5, the pressure reducing device 6, and the outdoor air-blowing fan 5f. Of those, the compressor 3 and the outdoor air-blowing fan 5f are illustrated in FIG. 18. Further, the extension pipes 10a and 10b are connected to the outdoor unit 2. The extension pipes 10a and 10b and the refrigerant pipes inside the outdoor unit 2 are connected to each other through joint portions 16a and 16b (for example, flare joints). The joint portions 16a and 16b are arranged inside the outdoor unit 2.

The outdoor unit 2 (example of the heat exchanger unit) according to this embodiment includes a refrigerant detection unit 98. The refrigerant detection unit 98 is arranged, for example, inside the outdoor unit 2 and below the joint portions 16a and 16b. The refrigerant detection unit 98 may be arranged below a brazed portion of the heat source-side heat exchanger 5. As the refrigerant detection unit 98, a gas sensor, for example, a semiconductor gas sensor or a hot-wire type semiconductor gas sensor, is used. The refrigerant detection unit 98 is configured to detect the refrigerant concentration within, for example, the air around the refrigerant detection unit 98, and to output the detection signal to the controller 30. The controller 30 is configured to determine the presence or absence of the leakage of the refrigerant based on the detection signal received from the refrigerant detection unit 98.

The refrigerant leakage detection processing according to this embodiment executed by the controller 30 is obtained by replacing the "refrigerant detection unit 99" and the "indoor air-blowing fan 7f" of the refrigerant leakage detection processing according to any one of the first to sixth embodiments described with reference to, for example, FIG. 7 to FIG. 9 and FIG. 11 to FIG. 15, by the "refrigerant detection unit 98" and the "outdoor air-blowing fan 5f", respectively. That is, in the refrigerant leakage detection processing according to this embodiment, when the leakage of the refrigerant is detected based on the detection signal received from the refrigerant detection unit 98, an operation of the outdoor air-blowing fan 5f is started. Therefore, the leaked refrigerant can be diffused to an installation space of the outdoor unit 2 (for example, outdoor space or machine room space). Hence, according to this embodiment, even if the refrigerant leaks from the outdoor unit 2, it is possible to inhibit the refrigerant concentration within the installation space of the outdoor unit 2 from increasing locally. Further, in the refrigerant leakage detection processing according to this embodiment, the outdoor air-blowing fan 5f can be stopped with a trigger that the refrigerant stops leaking. Hence, it is possible to prevent unnecessary energy from being consumed.

Ninth Embodiment

Figure 19:
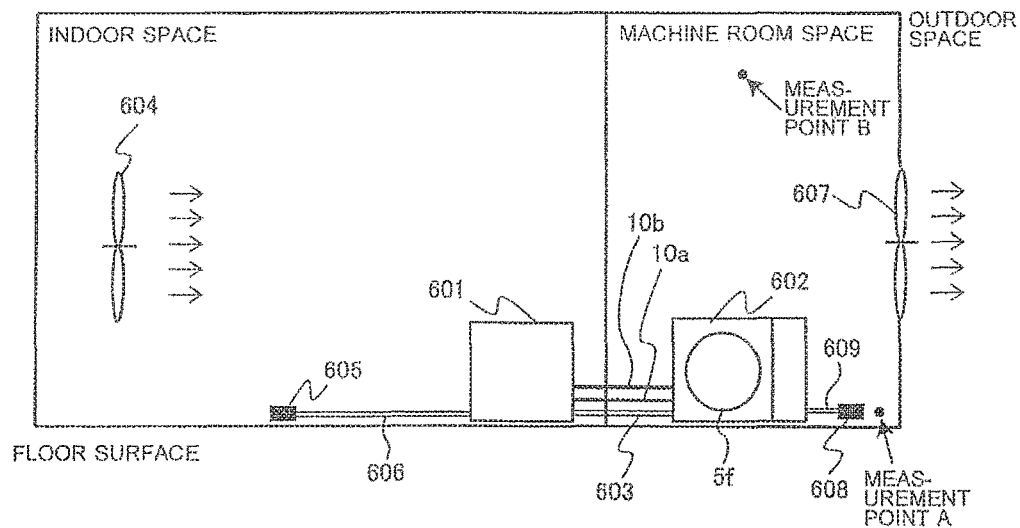
FIG. 19 is a diagram for schematically illustrating an overall configuration of a refrigeration cycle system according to a ninth embodiment and a tenth embodiment of the present invention.

Next, a refrigeration cycle system according to an eighth embodiment of the present invention is described. FIG. 19 is a diagram for schematically illustrating an overall configuration of the refrigeration cycle system according to this embodiment. In this embodiment, the refrigeration cycle apparatus included in the refrigeration cycle system is exemplified by a separate type showcase. As illustrated in FIG. 19, the showcase includes an indoor unit 601 (example of a load unit and example of the heat exchanger unit) installed within the indoor space, for example, inside a shop, and an outdoor unit 602 (example of the heat source unit and example of the heat exchanger unit) installed within, for example, the machine room space. The indoor unit 601 and the outdoor unit 602 are connected to each other through the extension pipes 10a and 10b. The indoor unit 601 according to this embodiment does not include an air-blowing fan configured to stir the air within the installation space. The outdoor unit 602 includes the outdoor air-blowing fan 5f.

Although not shown in FIG. 19, the controller 30 includes the indoor unit controller provided to the indoor unit 601 and the outdoor unit controller that is provided to the outdoor unit 602 and capable of conducting data communications to/from the indoor unit controller. The indoor unit controller and the outdoor unit controller are connected to each other through a control line 603.

In the indoor space, an air-blowing fan 604 configured to stir the air within the indoor space is provided separately from the showcase. The air-blowing fan 604 is provided outside the casing of the indoor unit 601 of the showcase. The air-blowing fan 604 can be operated, for example, independently of the showcase. The air-blowing fan 604 is connected to the controller 30 (for example, indoor unit controller) through a control line (not shown), and is operated by the control of the controller 30. When the refrigerant leaks into the indoor space, the air-blowing fan 604 is operated to stir the air within the indoor space together with leaked refrigerant. With this configuration, the leaked refrigerant is diffused to the indoor space, and hence it is possible to inhibit the refrigerant concentration from increasing locally within the indoor space. That is, the air-blowing fan 604 serves as a leaked refrigerant dilution unit configured to dilute the refrigerant leaked into the indoor space.

Further, in the indoor space, a refrigerant detection unit 605 configured to detect the refrigerant is provided separately from the showcase. The refrigerant detection unit 605 is provided outside the casing of the indoor unit 601 of the showcase. The refrigerant has a density larger than that of air under the atmospheric pressure, and hence the refrigerant detection unit 605 is provided, for example, near the floor surface within the indoor space. The refrigerant detection unit 605 is connected to the controller 30 (for example, indoor unit controller) through a communication line 606. The refrigerant detection unit 605 is configured to detect the refrigerant concentration within the air around the refrigerant detection unit 605, and to output the detection signal to the controller 30. The controller 30 is configured to determine the presence or absence of the leakage of the refrigerant based on the detection signal received from the refrigerant detection unit 605.

In the machine room space, an air-blowing fan 607 for ventilation configured to deliver the air within the machine room space to the outdoor space is provided separately from the showcase. The air-blowing fan 607 is provided outside the casing of the outdoor unit 602 of the showcase (for example, the wall portion of the machine room space facing the outdoor space). The air-blowing fan 607 can be operated, for example, independently of the showcase. The air-blowing fan 607 is connected to the controller 30 (for example, outdoor unit controller) through a control line (not shown), and is operated by the control of the controller 30. When the refrigerant leaks into the machine room space, the air-blowing fan 607 is operated to deliver the air within the machine room space together with leaked refrigerant. With this configuration, the leaked refrigerant is delivered to the outdoor space, and hence it is possible to inhibit the refrigerant concentration from increasing locally within the machine room space. That is, the air-blowing fan 607 serves as a leaked refrigerant dilution unit configured to dilute the refrigerant leaked into the machine room space.

Further, in the machine room space, a refrigerant detection unit 608 configured to detect the refrigerant is provided separately from the showcase. The refrigerant detection unit 608 is provided outside the casing of the outdoor unit 602 of the showcase. The refrigerant has a density larger than that of air under the atmospheric pressure, and hence the refrigerant detection unit 608 is provided near the floor surface within the machine room space. The refrigerant detection unit 608 is connected to the controller 30 (for example, outdoor unit controller) through a communication line 609. The refrigerant detection unit 608 is configured to detect the refrigerant concentration within the air around the refrigerant detection unit 608, and to output the detection signal to the controller 30. The controller 30 is configured to determine the presence or absence of the leakage of the refrigerant based on the detection signal received from the refrigerant detection unit 608.

Figure 20:
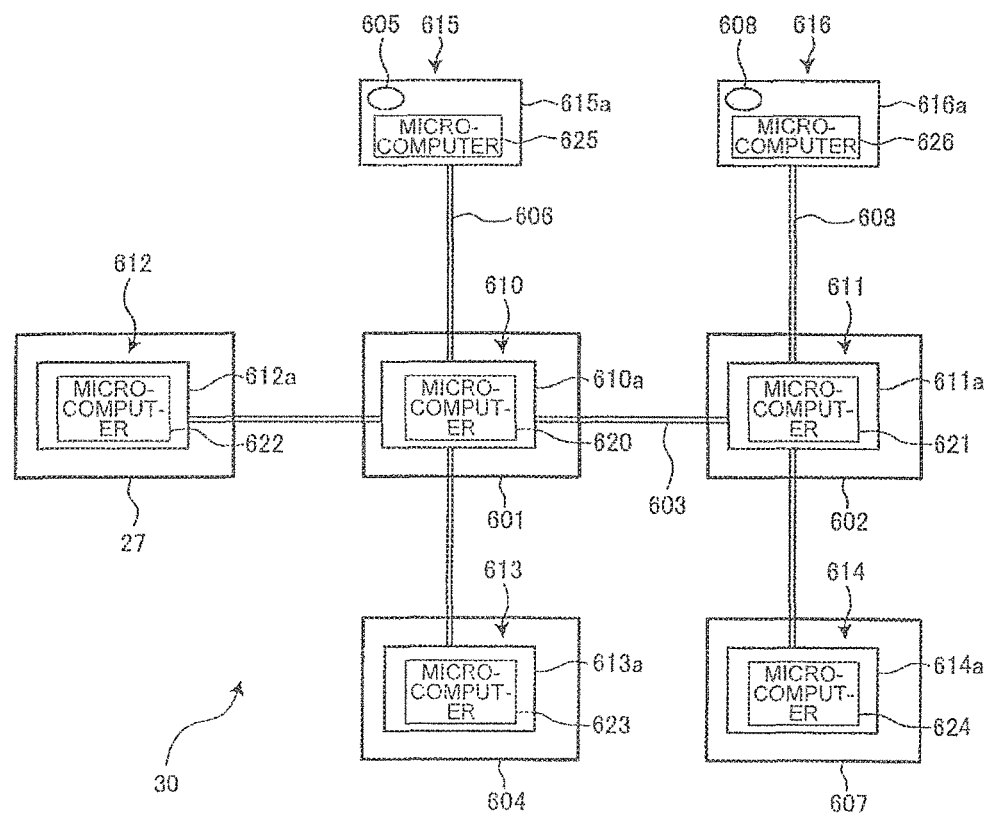
FIG. 20 is a block diagram for illustrating a configuration of the controller 30 of the refrigeration cycle system according to the ninth embodiment and the tenth embodiment of the present invention.

FIG. 20 is a block diagram for illustrating a configuration of the controller 30 of the refrigeration cycle system according to this embodiment. As illustrated in FIG. 20, the controller 30 includes an indoor unit controller 610 mounted to the indoor unit 601 and configured to control the indoor unit 601, an outdoor unit controller 611 mounted to the outdoor unit 602 and configured to control the outdoor unit 602, and a remote controller controller 612 mounted to the remote controller 27 (for example, operation unit provided in the indoor unit 601) and configured to control the remote controller 27.

The indoor unit controller 610 is communicably connected to the outdoor unit controller 611 and the remote controller controller 612 through the respective control lines. The indoor unit controller 610 includes a control board 610a. A microcomputer 620 is mounted on the control board 610a.

The outdoor unit controller 611 includes a control board 611a. A microcomputer 621 is mounted on the control board 611a.

The remote controller controller 612 includes a control board 612a. A microcomputer 622 is mounted on the control board 612a.

Further, an air-blowing fan controller 613 configured to control the air-blowing fan 604 is mounted to the air-blowing fan 604 according to this embodiment. An air-blowing fan controller 614 configured to control the air-blowing fan 607 is mounted to the air-blowing fan 607 according to this embodiment.

The air-blowing fan controller 613 is communicably connected to the indoor unit controller 610 through the control line. The air-blowing fan controller 613 includes a control board 613a. A microcomputer 623 is mounted on the control board 613a.

The air-blowing fan controller 614 is communicably connected to the outdoor unit controller 611 through the control line. The air-blowing fan controller 614 includes a control board 614a. A microcomputer 624 is mounted on the control board 614a.

Further, the controller 30 includes a sensor controller 615 configured to control the refrigerant detection unit 605 and a sensor controller 616 configured to control the refrigerant detection unit 608.

The sensor controller 615 is communicably connected to the indoor unit controller 610. The sensor controller 615 includes a control board 615a. A microcomputer 625 and the refrigerant detection unit 605 are unremovably mounted on the control board 615a.

The sensor controller 616 is communicably connected to the outdoor unit controller 611. The sensor controller 616 includes a control board 616*a*. A microcomputer 626 and the refrigerant detection unit 608 are unremovably mounted on the control board 616*a*.

The refrigerant detection units 605 and 608 according to this embodiment are mounted directly on the control boards 615*a* and 616*a*, respectively, but it suffices that the refrigerant detection units 605 and 608 are unremovably connected to the control boards 615*a* and 616*a*, respectively. For example, the refrigerant detection unit 605 may be provided in a position distant from the control board 615*a*, and a wiring extending from the refrigerant detection unit 605 may be unremovably connected to the control board 615*a* by soldering or other ways. The same applies to the refrigerant detection unit 608.

The microcomputers 625 and 626 of the sensor controllers 615 and 616 each include a rewritable nonvolatile memory. In the same manner as in the fifth embodiment, each nonvolatile memory is provided with a leakage history bit for storing a history of the refrigerant leakage. The leakage history bit can be set to "0" or "1". As the leakage history bit, "0" indicates a state of absence of refrigerant leakage history, and "1" indicates a state of presence of a refrigerant leakage history. The leakage history bit has an initial value of "0". That is, in a case of the microcomputers 625 and 626 in brand-new conditions or the microcomputers 625 and 626 having no refrigerant leakage history, the leakage history bit is set to "0". The leakage history bit of the microcomputer 625 is rewritten from "0" to "1" when the refrigerant detection unit 605 detects the leakage of the refrigerant. When the refrigerant detection unit 608 detects the leakage of the refrigerant, the leakage history bit of the microcomputer 626 is rewritten from "0" to "1". Both the leakage history bits of the microcomputers 625 and 626 can be rewritten from "0" to "1" irreversibly only in one way. Further, the leakage history bits of the microcomputers 625 and 626 are maintained irrespective of the presence or absence of electric power supply to the microcomputers 625 and 626.

Memories of the microcomputers 620, 621, and 622 of the indoor unit 601, the outdoor unit 602, and the remote controller 27 are each provided with a first leakage history bit corresponding to the leakage history bit of the microcomputer 625 and a second leakage history bit corresponding to the leakage history bit of the microcomputer 626. Those leakage history bits can be set to "0" or "1", and can be rewritten in both ways between "0" and "1". The first leakage history bit of each of the microcomputers 620, 621, and 622 has a value set to the same value as that of the leakage history bit of the microcomputer 625 acquired through communications. The second leakage history bit of each of the microcomputers 620, 621, and 622 has a value set to the same value as that of the leakage history bit of the microcomputer 626 acquired through communications. Even when returning to the initial value (for example, "0") due to an interruption of the electric power supply, the first leakage history bits and the second leakage history bits of the microcomputers 620, 621, and 622 are set to the same value as those of the leakage history bits of the microcomputers 625 and 626 again when the electric power supply is restarted.

When both the first leakage history bit and the second leakage history bit of the microcomputer 620 are set to "0", the indoor unit controller 610 normally controls the indoor unit 601. The indoor unit 601 in this state conducts and stops the operation in a normal state based on the operation through the remote controller 27. When the first leakage history bit of the microcomputer 620 is set to "1", the indoor unit controller 610 conducts, for example, control for forcedly operating the air-blowing fan 604 via the air-blowing fan controller 613.

When both the first leakage history bit and the second leakage history bit of the microcomputer 620 are set to "0", the outdoor unit controller 611 normally controls the outdoor unit 602. When the first leakage history bit or the second leakage history bit of the microcomputer 621 is set to "1", the outdoor unit controller 611 conducts, for example, control for stopping the compressor 3. The stoppage of the compressor 3 is continued as long as the first leakage history bit or the second leakage history bit of the microcomputer 621 is set to "1". Further, when the second leakage history bit of the microcomputer 621 is set to "1", the outdoor unit controller 611 conducts, for example, control for forcedly operating the air-blowing fan 607 via the air-blowing fan controller 614. At this time, the outdoor unit controller 611 may also conduct control for forcedly operating the outdoor air-blowing fan 5*f*.

When both the first leakage history bit and the second leakage history bit of the microcomputer 622 are set to "0", the remote controller controller 612 normally controls the remote controller 27. When the first leakage history bit or the second leakage history bit of the microcomputer 622 is set to "1", the remote controller controller 612 displays, for example, information including the abnormality type or the abnormality handling method on the display unit provided to the remote controller 27.

At this time, the remote controller controller 612 may display information on the refrigerant leakage point on the display unit based on which one of the first leakage history bit and the second leakage history bit is set to "1". For example, when the first leakage history bit is set to "1", information indicating that the leakage of the refrigerant has occurred in the indoor unit 601 is displayed, and when the second leakage history bit is set to "1", information indicating that the leakage of the refrigerant has occurred in the outdoor unit 602 is displayed. Further, the remote controller controller 612 may be configured to cause the audio output unit provided to the remote controller 27 to inform of the information on the abnormality type, the abnormality handling method, or the refrigerant leakage point by voice.

Timings to stop the air-blowing fans 604 and 607 and the outdoor air-blowing fan 5*f* that are being forcedly operated are the same as those of the first to fourth embodiments. That is, each of the controllers that form the controller 30 stop the air-blowing fans 604 and 607 and the outdoor air-blowing fan 5*f* with a trigger that the temporal change of the refrigerant concentration shifts from positive to negative or when the temporal change of the refrigerant concentration is negative.

Figure 21:
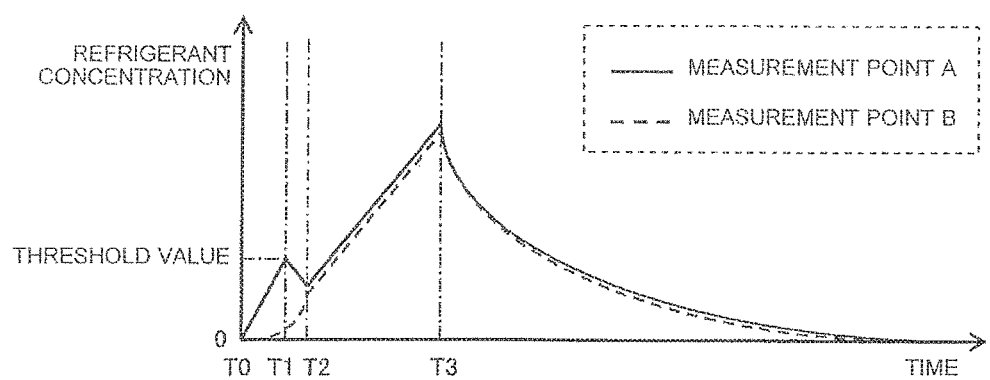
FIG. 21 is a graph for showing an example of a temporal change of a refrigerant concentration exhibited when refrigerant is leaked from an outdoor unit 602 of the refrigeration cycle system according to the ninth embodiment of the present invention and an air-blowing fan 607 for ventilation is operated.
Figure 22:
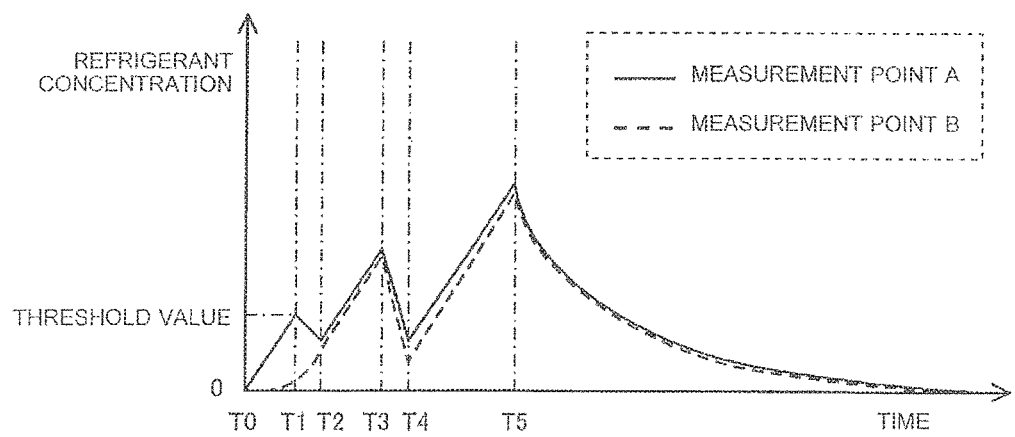
FIG. 22 is a graph for showing an example of the temporal change of the refrigerant concentration exhibited when the refrigerant is leaked from the outdoor unit 602 of the refrigeration cycle system according to the ninth embodiment of the present invention and the air-blowing fan 607 for ventilation is operated.

FIG. 21 and FIG. 22 are graphs for showing an example of the temporal change of the refrigerant concentration exhibited when the refrigerant is leaked from the outdoor unit 602 of the refrigeration cycle system according to this embodiment and the air-blowing fan 607 for ventilation is operated. FIG. 21 corresponds to FIG. 6, and FIG. 22 corresponds to FIG. 10. The refrigerant concentration was measured at the measurement point A near the arrangement position of the refrigerant detection unit 608 and the measurement point B distant from both the outdoor unit 602 and the floor surface within the machine room space (see FIG. 19). As shown in FIG. 21 and FIG. 22, the refrigerant concentration increases and decreases in the same manner as in the graphs of FIG. 6 and FIG. 10, respectively. However, in this embodiment, the refrigerant leaked into the machine room space is delivered to the outdoor space by the air-blowing fan 607 for ventilation, and hence the refrigerant concentration measured at the measurement points A and B becomes zero at the end.

According to this embodiment, in the same manner as in the fifth embodiment, the leakage history of the refrigerant is written to the nonvolatile memories of the control boards 615a and 616a irreversibly. In order to reset the leakage history of the refrigerant, the control boards 615a and 616a need to be replaced by other control boards having no leakage history. When the control boards 615a and 616a are replaced, the refrigerant detection units 605 and 608 unremovably connected to the control boards 615a and 616a are also replaced. Hence, the refrigerant detection units 605 and 608 exposed to the refrigerant atmosphere to have changed detection characteristics can be prevented from being kept in continuous use. Further, in this embodiment, the operation of the showcase cannot be restarted unless the control boards 615a and 616a are replaced, and hence the operation of the showcase that has not been repaired at the refrigerant leakage point can be prevented from being restarted due to a human error or intentionally.

In this embodiment, only the memories of the microcomputers 620, 621, and 622 of the indoor unit 601, the outdoor unit 602, and the remote controller 27 are provided with the first leakage history bit and the second leakage history bit, but the memories of the microcomputers 623 and 624 of the air-blowing fans 604 and 607 may also be provided with the first leakage history bit and the second leakage history bit.

Further, in this embodiment, the air-blowing fans 604 and 607 include the air-blowing fan controllers 613 and 614, respectively, and hence the air-blowing fan 604 and the indoor unit 601 as well as the air-blowing fan 607 and the outdoor unit 602 are connected to each other through the respective control lines. However, the air-blowing fans 604 and 607 do not necessarily include the controller. When the air-blowing fans 604 and 607 do not include the controller, for example, the air-blowing fan 604 and the indoor unit 601 as well as the air-blowing fan 607 and the outdoor unit 602 are connected to each other through a power supply line. In this case, the operation and stoppage of the air-blowing fan 604 are controlled by a relay of the control board 610a of the indoor unit controller 610, and the operation and stoppage of the air-blowing fan 607 are controlled by a relay of a control board 611a of the outdoor unit controller 611.

Further, in this embodiment and the above-mentioned fifth embodiment, the leakage history bit is exemplified as the leakage history storage area provided to the nonvolatile memory, but the present invention is not limited thereto. The nonvolatile memory may be provided with, for example, the leakage history storage area having equal to or larger than 2 bits. The leakage history storage area selectively stores any one of first information indicating the state of absence of refrigerant leakage history and second information indicating the state of presence of a refrigerant leakage history. Further, the information stored in the leakage history storage area can be changed from the first information to the second information only in one way. The controller 30 (for example, sensor controllers 615 and 616) is configured to change the information stored in the leakage history storage area from the first information to the second information when detecting the leakage of the refrigerant.

Tenth Embodiment

A refrigeration cycle system according to a tenth embodiment of the present invention is described with reference to FIG. 19 and FIG. 20 already referred to above. In this embodiment, the nonvolatile memory of the microcomputer 625 mounted on the control board 615a is provided with the failure bit for storing the failure history of the refrigerant detection unit 605 in place of the leakage history bit described in the ninth embodiment or in addition to the leakage history bit. In the same manner, the nonvolatile memory of the microcomputer 626 mounted on the control board 616a is provided with the failure bit for storing the failure history of the refrigerant detection unit 608 in place of the leakage history bit described in the ninth embodiment or in addition to the leakage history bit. In the same manner as the leakage history bit, the failure bit is set to "0" or "1", and has an initial value of "0". When the refrigerant detection unit 605 fails, the failure bit of the microcomputer 625 is rewritten from "0" to "1", and when the refrigerant detection unit 608 fails, the failure bit of the microcomputer 626 is rewritten from "0" to "1". The failure bits of the microcomputers 625 and 626 can be rewritten from "0" to "1" irreversibly only in one way in the same manner as the leakage history bit. Further, the failure bits of the microcomputers 625 and 626 are maintained irrespective of the presence or absence of the electric power supply to the microcomputers 625 and 626.

Further, memories of the microcomputers 620, 621, and 622 are each provided with a first failure bit corresponding to the failure bit of the microcomputer 625 and a second failure bit corresponding to the failure bit of the microcomputer 626. Those failure bits can be set to "0" or "1", and can be rewritten in both ways between "0" and "1". The first failure bits of the microcomputers 620, 621, and 622 have values set to the same value as that of the failure bit of the microcomputer 625 acquired through communications. The second failure bits of the microcomputers 620, 621, and 622 have values set to the same value as that of the failure bit of the microcomputer 626 acquired through communications. Even when returning to the initial value (for example, "0") due to an interruption of the electric power supply, the first failure bits and the second failure bits of the microcomputers 620, 621, and 622 are set to the same value as that of the failure bits of the microcomputers 625 and 626 again when the electric power supply is restarted.

In the same manner as in the ninth embodiment, when both the first failure bit and the second failure bit are set to "0", the indoor unit controller 610, the outdoor unit controller 611, and the remote controller controller 612 normally control the indoor unit 601, the outdoor unit 602, and the remote controller 27, respectively.

When the first failure bit or the second failure bit of the microcomputer 620 is set to "1", the indoor unit controller 610 conducts, for example, control for stopping the operation of the indoor unit 601. Further, when the first failure bit of the microcomputer 620 is set to "1", the indoor unit controller 610 may conduct control for forcedly operating the air-blowing fan 604 via the air-blowing fan controller 613.

When the first failure bit or the second failure bit of the microcomputer 621 is set to "1", the outdoor unit controller 611 conducts, for example, the control for stopping the compressor 3. The stoppage of the compressor 3 is continued as long as the first failure bit or the second failure bit of the microcomputer 621 is set to "1". Further, when the second failure bit of the microcomputer 621 is set to "1", the outdoor unit controller 611 may conduct control for forcedly operating the air-blowing fan 607 via the air-blowing fan controller 614. At this time, the outdoor unit controller 611 may also conduct control for forcedly operating the outdoor air-blowing fan 5f.

When both the first failure bit and the second failure bit of the microcomputer 622 are set to "0", the remote controller controller 612 normally controls the remote controller 27. When the first failure bit or the second failure bit of the microcomputer 622 is set to "1", the remote controller controller 612 displays, for example, information including the abnormality type or the abnormality handling method on the display unit provided to the remote controller 27. At this time, the remote controller controller 612 may display information on the failure point on the display unit based on which one of the first failure bit and the second failure bit is set to "1". For example, when the first failure bit is set to "1", the remote controller controller 612 displays information indicating that the refrigerant detection unit 605 within the indoor space has failed, and when the second failure bit is set to "1", displays information indicating that the refrigerant detection unit 608 within the machine room space has failed. Further, the remote controller controller 612 may be configured to cause the audio output unit provided to the remote controller 27 to inform of the information on the abnormality type, the abnormality handling method, or the failure point by voice.

As described in this embodiment and the above-mentioned ninth embodiment, the refrigerant detection unit or the air-blowing fan is not necessarily built into the casing of the indoor unit or the outdoor unit of the refrigeration cycle apparatus. The refrigerant detection unit and the air-blowing fan may be provided separately from the refrigeration cycle apparatus as long as the refrigerant detection unit and the air-blowing fan are communicably connected to the refrigeration cycle apparatus through the control line or other ways, or are connected to the refrigeration cycle apparatus in a remotely controllable manner through the power supply line.

Further, in this embodiment and the above-mentioned ninth embodiment, the air-blowing fan 604 configured to stir the air within the indoor space is provided in the indoor space, and the air-blowing fan 607 for ventilation configured to deliver the air within the machine room space to the outdoor space is provided in the machine room space, but the present invention is not limited thereto. For example, an air-blowing fan for ventilation configured to deliver the air within the indoor space to the outdoor space may be provided in the indoor space, or an air-blowing fan configured to stir the air within the machine room space may be provided in the machine room space.

Further, in this embodiment and the above-mentioned sixth embodiment, the failure bit is exemplified as the failure history storage area provided to the nonvolatile memory, but the present invention is not limited thereto. The nonvolatile memory may be provided with, for example, the failure history storage area having equal to or larger than 2 bits. The failure history storage area selectively stores any one of the first information indicating the state of having no failure history in the refrigerant detection unit and the second information indicating the state of having a failure history in the refrigerant detection unit. Further, the information stored in the failure history storage area can be changed from the first information to the second information only in one way. The controller 30 (for example, sensor controller 615) is configured to change, when the refrigerant detection unit (for example, refrigerant detection unit 605 mounted on the control board 615a of the sensor controller 615) fails, the information stored in the failure history storage area from the first information to the second information.

Conclusions to First to Tenth Embodiments

As described above, the refrigeration cycle apparatus according to the above-mentioned embodiments includes: the refrigeration cycle (for example, refrigeration cycle 40 or refrigerant circuit 310) configured to circulate the refrigerant; the heat exchanger unit (for example, indoor unit 1, outdoor unit 2, load unit 400, or heat source unit 300) configured to accommodate at least the heat exchanger (for example, load-side heat exchanger 7 or 202 or heat source-side heat exchanger 5 or 201) of the refrigeration cycle; and the controller (for example, controller 30, 301, or 401) configured to control the heat exchanger unit. The heat exchanger unit includes: the air-blowing fan (for example, indoor air-blowing fan 7f, outdoor air-blowing fan 5f, or air-blowing fan 435); and the refrigerant detection unit (for example, refrigerant detection unit 98, 99, or 440) configured to detect the concentration of the leaked refrigerant and to output the detection signal to the controller. The controller is configured to operate the air-blowing fan when detecting the leakage of the refrigerant, and to stop the air-blowing fan with a trigger that the temporal change of the concentration of the leaked refrigerant shifts from positive to negative.

Further, the refrigeration cycle apparatus according to the above-mentioned embodiments includes: the refrigeration cycle (for example, refrigeration cycle 40 or refrigerant circuit 310) configured to circulate the refrigerant; the heat exchanger unit (for example, indoor unit 1, outdoor unit 2, load unit 400, or heat source unit 300) configured to accommodate at least the heat exchanger (for example, load-side heat exchanger 7 or 202 or heat source-side heat exchanger 5 or 201) of the refrigeration cycle; and the controller (for example, controller 30, 301, or 401) configured to control the heat exchanger unit. The heat exchanger unit includes: the air-blowing fan (for example, indoor air-blowing fan 7f, outdoor air-blowing fan 5f, or air-blowing fan 435); and the refrigerant detection unit (for example, refrigerant detection unit 98, 99, or 440) configured to detect the concentration of the leaked refrigerant and to output the detection signal to the controller. The controller is configured to operate the air-blowing fan when detecting the leakage of the refrigerant, and to stop the air-blowing fan when the temporal change of the concentration of the leaked refrigerant is negative.

Further, in the refrigeration cycle apparatus according to the above-mentioned embodiments, the controller may be configured to operate the stopped air-blowing fan again triggered by becoming positive from negative of a temporal change of the concentration of the leaked refrigerant.

Further, in the refrigeration cycle apparatus according to the above-mentioned embodiments, the controller may be configured to operate the stopped air-blowing fan again when the temporal change of the concentration of the leaked refrigerant is positive.

Further, in the refrigeration cycle apparatus according to the above-mentioned embodiments, the controller may be configured to stop the air-blowing fan when the state in which the temporal change of the concentration of the leaked refrigerant is negative is continued for equal to or longer than the threshold time period set in advance. Further, in the refrigeration cycle apparatus according to the above-mentioned embodiments, the controller may be configured to be inhibited from determining, until the predetermined time period has elapsed since the startup of the air-blowing fan, whether or not the temporal change of the concentration of the leaked refrigerant has shifted from positive to negative. Further, in the refrigeration cycle apparatus according to the above-mentioned embodiments, the controller may be configured to be inhibited from determining, until the predetermined time period has elapsed since the startup of the air-blowing fan, whether or not the temporal change of the concentration of the leaked refrigerant is negative.

Further, in the refrigeration cycle apparatus according to the above-mentioned embodiments, the heat exchanger may be a load-side heat exchanger (for example, load-side heat exchanger 7 or 202) of the refrigeration cycle.

Further, in the refrigeration cycle apparatus according to the above-mentioned embodiments, the heat exchanger may be a heat source-side heat exchanger (for example, heat source-side heat exchanger 5 or 201) of the refrigeration cycle.

Further, in the refrigeration cycle apparatus according to the above-mentioned embodiments, the controller 30 includes: the control board 31*b* to which the refrigerant detection unit 99 is unremovably connected; and the nonvolatile memory provided on the control board 31*b*. The nonvolatile memory is provided with the leakage history storage area for storing any one of the first information (for example, leakage history bit of "0") indicating the state of absence of refrigerant leakage history and the second information (for example, leakage history bit of "1") indicating the state of presence of a refrigerant leakage history. The information stored in the leakage history storage area can be changed from the first information to the second information only in one way. The controller 30 may be configured to change the information stored in the leakage history storage area from the first information to the second information when detecting the leakage of the refrigerant.

Further, in the refrigeration cycle apparatus according to the above-mentioned embodiments, the controller 30 includes: the control board 31*b* to which the refrigerant detection unit 99 is unremovably connected; and the nonvolatile memory provided on the control board 31*b*. The nonvolatile memory is provided with the failure history storage area for storing any one of the first information (for example, failure bit of "0") indicating the state of having no failure history in the refrigerant detection unit 99 and the second information (for example, failure bit of "1") indicating the state of having a failure history in the refrigerant detection unit 99. The information stored in the failure history storage area can be changed from the first information to the second information only in one way. The controller 30 may be configured to change the information stored in the failure storage area from the first information to the second information when the refrigerant detection unit 99 fails.

The refrigeration cycle apparatus according to the above-mentioned embodiments includes: the refrigeration cycle (for example, refrigeration cycle 40 or refrigerant circuit 310) configured to circulate the refrigerant; the heat exchanger unit (for example, indoor unit 1, outdoor unit 2, load unit 400, or heat source unit 300) configured to accommodate at least the heat exchanger (for example, load-side heat exchanger 7 or 202 or heat source-side heat exchanger 5 or 201) of the refrigeration cycle; and the controller (for example, controller 30, 301, or 401) configured to control the heat exchanger unit. The heat exchanger unit includes the refrigerant detection unit 99 configured to detect the refrigerant. The controller includes: the control board 31*b* to which the refrigerant detection unit 99 is unremovably connected; and the nonvolatile memory provided on the control board 31*b*. The nonvolatile memory is provided with the leakage history storage area for storing any one of the first information (for example, leakage history bit of "0") indicating the state of absence of refrigerant leakage history and the second information (for example, leakage history bit of "1") indicating the state of presence of a refrigerant leakage history. The information stored in the leakage history storage area can be changed from the first information to the second information only in one way. The controller is configured to change the information stored in the leakage history storage area from the first information to the second information when detecting the leakage of the refrigerant.

Further, in the refrigeration cycle apparatus according to the above-mentioned embodiments, the heat exchanger unit further includes the air-blowing fan (for example, indoor air-blowing fan 7*f*, outdoor air-blowing fan 5*f*, or air-blowing fan 435). The controller may be configured to operate the air-blowing fan when the information stored in the leakage history storage area is changed from the first information to the second information.

Further, the refrigeration cycle apparatus according to the above-mentioned embodiments includes the outdoor unit (for example, outdoor unit 2 or heat source unit 300) configured to accommodate at least the compressor of the refrigeration cycle. The controller 30 includes: a first controller (for example, indoor unit controller 31) including the control board 31*b* and the nonvolatile memory; and a second controller (for example, outdoor unit controller 32) communicably connected to the first controller and configured to control the outdoor unit. The memory of the second controller is provided with the leakage history storage area corresponding to the leakage history storage area provided to the nonvolatile memory. The leakage history storage area provided to the memory of the second controller may be configured to store the same information as the information stored in the leakage history storage area provided to the nonvolatile memory.

Further, in the refrigeration cycle apparatus according to the above-mentioned embodiments, the second controller may be configured to stop the compressor when the information stored in the leakage history storage area provided to the memory of the second controller is changed from the first information to the second information.

Further, the refrigeration cycle apparatus according to the above-mentioned embodiments further includes the operation unit (for example, operation unit 26 or remote controller 27) including the display unit or the audio output unit that is configured to inform of the information. The controller 30 includes: the first controller (for example, indoor unit controller 31) including the control board 31*b* and the nonvolatile memory; and a third controller (for example, remote controller controller 33) communicably connected to the first controller and configured to control the operation unit. A memory of the third controller is provided with the leakage history storage area corresponding to the leakage history storage area provided to the nonvolatile memory. The leakage history storage area provided to the memory of the third controller may be configured to store the same information as the information stored in the leakage history storage area provided to the nonvolatile memory.

Further, in the refrigeration cycle apparatus according to the above-mentioned embodiments, the third controller may be configured to cause the operation unit to inform of the information including the abnormality type or the abnormality handling method when the information stored in the leakage history storage area provided to the memory of the third controller is changed from the first information to the second information.

The refrigeration cycle apparatus according to the above-mentioned embodiments includes: the refrigeration cycle (for example, refrigeration cycle 40 or refrigerant circuit 310) configured to circulate the refrigerant; the heat exchanger unit (for example, indoor unit 1, outdoor unit 2, load unit 400, or heat source unit 300) configured to accommodate at least the heat exchanger (for example, load-side heat exchanger 7 or 202 or heat source-side heat exchanger 5 or 201) of the refrigeration cycle; and the controller (for example, controller 30, 301, or 401) configured to control the heat exchanger unit. The heat exchanger unit includes the refrigerant detection unit 99 configured to detect the refrigerant. The controller includes: the control board 31b to which the refrigerant detection unit 99 is unremovably connected; and the nonvolatile memory provided on the control board 31b. The nonvolatile memory is provided with the failure history storage area for storing any one of the first information (for example, failure bit of "0") indicating the state of having no failure history in the refrigerant detection unit 99 and the second information (for example, failure bit of "1") indicating the state of having a failure history in the refrigerant detection unit 99. The information stored in the failure history storage area can be changed from the first information to the second information only in one way. The controller is configured to change the information stored in the failure history storage area from the first information to the second information when the refrigerant detection unit 99 fails.

Further, in the refrigeration cycle apparatus according to the above-mentioned embodiments, the heat exchanger unit further includes the air-blowing fan (for example, indoor air-blowing fan 7f, outdoor air-blowing fan 5f, or air-blowing fan 435). The controller may be configured to operate the air-blowing fan when the information stored in the failure history storage area is changed from the first information to the second information.

Further, the refrigeration cycle apparatus according to the above-mentioned embodiments includes the outdoor unit (for example, outdoor unit 2 or heat source unit 300) configured to accommodate at least the compressor of the refrigeration cycle. The controller 30 includes: the first controller (for example, indoor unit controller 31) including the control board 31b and the nonvolatile memory; and the second controller (for example, outdoor unit controller 32) communicably connected to the first controller and configured to control the outdoor unit. The memory of the second controller is provided with the failure history storage area corresponding to the failure history storage area provided to the nonvolatile memory. The failure history storage area provided to the memory of the second controller may be configured to store the same information as the information stored in the failure history storage area provided to the nonvolatile memory.

Further, in the refrigeration cycle apparatus according to the above-mentioned embodiments, the second controller may be configured to stop the compressor when the information stored in the failure history storage area provided to the memory of the second controller is changed from the first information to the second information.

Further, the refrigeration cycle apparatus according to the above-mentioned embodiments further includes the operation unit (for example, operation unit 26 or remote controller 27) including the display unit or the audio output unit that is configured to inform of the information. The controller 30 includes: the first controller (for example, indoor unit controller 31) including the control board 31b and the nonvolatile memory; and the third controller (for example, remote controller controller 33) communicably connected to the first controller and configured to control the operation unit. The memory of the third controller is provided with the failure history storage area corresponding to the failure history storage area provided to the nonvolatile memory. The failure history storage area provided to the memory of the third controller may be configured to store the same information as the information stored in the failure history storage area provided to the nonvolatile memory.

Further, in the refrigeration cycle apparatus according to the above-mentioned embodiments, the third controller may be configured to cause the operation unit to inform of the information including the abnormality type or the abnormality handling method when the information stored in the failure history storage area provided to the memory of the third controller is changed from the first information to the second information.

The refrigeration cycle system according to the above-mentioned embodiments includes: the refrigeration cycle apparatus including the refrigeration cycle 40 configured to circulate the refrigerant and the controller 30 configured to control the refrigeration cycle 40; the air-blowing fan (for example, air-blowing fans 604 and 607) controlled by the controller 30; and the refrigerant detection unit (for example, refrigerant detection unit 605 or 608) configured to detect the concentration of the leaked refrigerant and to output the detection signal to the controller 30. The controller 30 is configured to operate the air-blowing fan when detecting the leakage of the refrigerant, and to stop the air-blowing fan with a trigger that the temporal change of the concentration of the leaked refrigerant shifts from positive to negative.

The refrigeration cycle system according to the above-mentioned embodiments includes: the refrigeration cycle apparatus including the refrigeration cycle 40 configured to circulate the refrigerant and the controller 30 configured to control the refrigeration cycle 40; the air-blowing fan (for example, air-blowing fans 604 and 607) controlled by the controller 30; and the refrigerant detection unit (for example, refrigerant detection unit 605 or 608) configured to detect the concentration of the leaked refrigerant and to output the detection signal to the controller 30. The controller 30 is configured to operate the air-blowing fan when detecting the leakage of the refrigerant, and to stop the air-blowing fan when the temporal change of the concentration of the leaked refrigerant is negative.

The refrigeration cycle system according to the above-mentioned embodiments includes: the refrigeration cycle apparatus including the refrigeration cycle 40 configured to circulate the refrigerant and the controller 30 configured to control the refrigeration cycle 40; and the refrigerant detection unit (for example, refrigerant detection unit 605 or 608) configured to detect the refrigerant. The controller 30 includes: the control board (for example, control boards 615a and 616a) to which the refrigerant detection unit is unremovably connected; and the nonvolatile memory provided on the control board. The nonvolatile memory is provided with the leakage history storage area for storing any one of the first information (for example, leakage history bit of "0") indicating the state of absence of refrigerant leakage history and the second information (for example, leakage history bit of "1") indicating the state of presence of a refrigerant leakage history. The information stored in the leakage history storage area can be changed from the first information to the second information only in one way. The controller 30 is configured to change the information stored in the leakage history storage area from the first information to the second information when detecting the leakage of the refrigerant.

The refrigeration cycle system according to the above-mentioned embodiments includes: the refrigeration cycle apparatus including the refrigeration cycle 40 configured to circulate the refrigerant and the controller 30 configured to control the refrigeration cycle 40; and the refrigerant detection unit (for example, refrigerant detection unit 605 or 608) configured to detect the refrigerant. The controller 30 includes: the control board (for example, control boards 615a and 616a) to which the refrigerant detection unit is unremovably connected; and the nonvolatile memory provided on the control board. The nonvolatile memory is provided with the failure history storage area for storing any one of the first information (for example, failure bit of "0") indicating the state of having no failure in the refrigerant detection unit history and the second information (for example, failure bit of "1") indicating the state of having a failure history in the refrigerant detection unit. The information stored in the failure history storage area can be changed from the first information to the second information only in one way. The controller 30 is configured to change the information stored in the failure history storage area from the first information to the second information when the refrigerant detection unit fails.

Other Embodiments

The present invention is not limited to the above-mentioned embodiments, and various modifications may be made thereto.

For example, in the above-mentioned embodiments, the refrigeration cycle apparatus is exemplified by the air-conditioning apparatus, the heat pump water heater, and the showcase. However, the present invention can be applied to another refrigeration cycle apparatus, e.g., a chiller.

Further, the embodiments described above and the modifications may be carried out in combinations.

REFERENCE SIGNS LIST 1 indoor unit 2 outdoor unit 3 compressor 4 refrigerant flow switching device 5 heat source-side heat exchanger 5f outdoor air-blowing fan 6 pressure reducing device 7 load-side heat exchanger 7f indoor air-blowing fan 9a, 9b indoor pipe 10a, 10b extension pipe 11 suction pipe 12 discharge pipe 13a, 13b extension pipe connecting valve 14a, 14b, 14c service port 15a, 15b, 16a, 16b joint portion 20 partition portion 20a air passage opening part 25 electrical component box 26 operation unit 27 remote controller 30 controller 31 indoor unit controller 31a, 31b control board 32 outdoor unit controller 32a control board 33 remote controller controller 33a control board 34, 35, 36, 37 microcomputer 38, 39 control line 40 refrigeration cycle 81 air passage 91 suction air temperature sensor 92 heat exchanger inlet temperature sensor 93 heat exchanger temperature sensor 98, 99 refrigerant detection unit 107 impeller 108 fan casing 108a air outlet opening part 108b suction opening 111 casing 112 air inlet 113 air outlet 114a first front panel 114b second front panel 114c third front panel 115a, 115b space 120 indoor space 201 heat source-side heat exchanger 202 load-side heat exchanger 203 compressor 204 refrigerant flow switching device 205 intermediate pressure receiver 206 first pressure reducing device 207 second pressure reducing device 211 suction pipe 251 hot-water storage tank 252 expansion tank 253 pump 254 booster heater 255 three-way valve 256 strainer 257 flow switch 258 pressure relief valve 259 air purge valve 260 submerged heater 261 coil 262, 263 drain outlet 264 manual air purge valve 281a, 281b sanitary circuit-side pipe 282a, 282b heater circuit-side pipe 300 heat source unit 301 controller 310 refrigerant circuit 311, 312 extension pipe 313, 314, 315, 316 joint portion 400 load unit 401 controller 410 water circuit 420 casing 421 water circuit chamber 431 air inlet 432 air outlet 433 duct 434 air flow passage 435 air-blowing fan 436, 437 penetration part 440 refrigerant detection unit 501 operation unit 510 control line 601 indoor unit 602 outdoor unit 603 control line 604 air-blowing fan 605 refrigerant detection unit 606 communication line 607 air-blowing fan 608 refrigerant detection unit 609 communication line 610 indoor unit controller 610a control board 611 outdoor unit controller 611a control board 612 remote controller controller 612a control board 613, 614 air-blowing fan controller 613a, 614a control board 615, 616 sensor controller 615a, 616a control board 620, 621, 622, 623, 624, 625, 626 microcomputer.

The invention claimed is:

1. A refrigeration cycle apparatus, comprising:
a refrigeration cycle configured to circulate refrigerant;
a heat exchanger unit configured to accommodate at least a heat exchanger of the refrigeration cycle; and
a controller configured to control the heat exchanger unit, the heat exchanger unit comprising
an air-blowing fan, and
a refrigerant detector configured to detect a concentration of leaked refrigerant and to output a detection signal to the controller, and
the controller being configured to operate the air-blowing fan when detecting leakage of the refrigerant, and to stop the air-blowing fan after a temporal change of the concentration of the leaked refrigerant changes from positive to negative, wherein
the controller is configured to operate the stopped air-blowing fan again after the temporal change of the concentration of the leaked refrigerant becomes positive from negative, and
the temporal change of the concentration of refrigerant includes continuously detecting the concentration of the refrigerant with predetermined time intervals from an initial detection of refrigerant leakage.

2. A refrigeration cycle apparatus, comprising:
a refrigeration cycle configured to circulate refrigerant;
a heat exchanger unit configured to accommodate at least a heat exchanger of the refrigeration cycle; and
a controller configured to control the heat exchanger unit, the heat exchanger unit comprising
an air-blowing fan, and
a refrigerant detector configured to detect a concentration of leaked refrigerant and to output a detection signal to the controller, and
the controller being configured to operate the air-blowing fan when detecting leakage of the refrigerant, and to stop the air-blowing fan when a temporal change of the concentration of the leaked refrigerant is negative, wherein
the controller is configured to operate the stopped air-blowing fan again after the temporal change of the concentration of the leaked refrigerant becomes positive from negative, and
the temporal change of the concentration of refrigerant includes continuously detecting the concentration of the refrigerant with predetermined time intervals from an initial detection of refrigerant leakage.

3. The refrigeration cycle apparatus of claim 1, wherein the controller is configured to stop the air-blowing fan when a state in which the temporal change of the concentration of the leaked refrigerant is negative is continued for equal to or longer than a threshold time period set in advance.

4. The refrigeration cycle apparatus of claim 1, wherein the heat exchanger comprises a load-side heat exchanger of the refrigeration cycle.

5. The refrigeration cycle apparatus of claim 1, wherein the heat exchanger comprises a heat source-side heat exchanger of the refrigeration cycle.

6. The refrigeration cycle apparatus of claim 1, wherein the controller comprises
a control board to which the refrigerant detector is unremovably connected, and
a nonvolatile memory provided on the control board, the nonvolatile memory being provided with a leakage history storage area for storing any one of first information indicating a state of absence of refrigerant leakage history and second information indicating a state of presence of a refrigerant leakage history at a time,
changing of the information stored in the leakage history storage area is allowed only in one way from the first information to the second information, and
the controller is configured to change the information stored in the leakage history storage area from the first information to the second information when detecting the leakage of the refrigerant.

7. The refrigeration cycle apparatus of claim 1, wherein the controller comprises
a control board to which the refrigerant detector is unremovably connected, and
a nonvolatile memory provided on the control board, the nonvolatile memory is provided with a failure storage area for storing any one of first information indicating a state of having no failure history in the refrigerant detector, and second information indicating a state of having a failure history in the refrigerant detector at a time,
changing of the information stored in the failure storage area is allowed only in one way from the first information to the second information, and
the controller is configured to change the information stored in the failure storage area from the first information to the second information when detecting a failure of the refrigerant detector occurs.

8. A refrigeration cycle apparatus, comprising:
a refrigeration cycle configured to circulate refrigerant;
a heat exchanger unit configured to accommodate at least a heat exchanger of the refrigeration cycle; and
a controller configured to control the heat exchanger unit, the heat exchanger unit comprising a refrigerant detector configured to detect the refrigerant,
the controller comprising
a control board to which the refrigerant detector is unremovably connected, and
a nonvolatile memory provided on the control board, the nonvolatile memory being provided with a leakage history storage area for storing any one of first information indicating a state of absence of refrigerant leakage history and second information indicating a state of presence of a refrigerant leakage history at a time, wherein
changing of the information stored in the leakage history storage area is allowed only in one way from the first information to the second information, and
the controller is configured to change the information stored in the leakage history storage area from the first information to the second information when detecting the leakage of the refrigerant.

9. The refrigeration cycle apparatus of claim 8, wherein the heat exchanger unit further comprises an air-blowing fan, and
the controller is configured to operate the air-blowing fan when the information stored in the leakage history storage area is changed from the first information to the second information.

10. The refrigeration cycle apparatus of claim 8, further comprising an outdoor unit configured to accommodate at least a compressor of the refrigeration cycle, wherein
the controller comprises
a first controller comprising the control board and the nonvolatile memory,
a second controller communicably connected to the first controller and configured to control the outdoor unit,
a memory of the second controller is provided with a leakage history storage area corresponding to the leakage history storage area provided to the nonvolatile memory, and
the leakage history storage area provided to the memory of the second controller is configured to store the same information as the information stored in the leakage history storage area provided to the nonvolatile memory.

11. The refrigeration cycle apparatus of claim 10, wherein the second controller is configured to stop the compressor when the information stored in the leakage history storage area provided to the memory of the second controller is changed from the first information to the second information.

12. The refrigeration cycle apparatus of claim 8, further comprising an operation unit comprising a display unit or an audio output unit that is configured to inform of information, wherein
the controller comprises
a first controller comprising the control board and the nonvolatile memory, and
a third controller communicably connected to the first controller and configured to control the operation unit,
a memory of the third controller is provided with a leakage history storage area corresponding to the leakage history storage area provided to the nonvolatile memory, and
the leakage history storage area provided to the memory of the third controller is configured to store the same information as the information stored in the leakage history storage area provided to the nonvolatile memory.

13. The refrigeration cycle apparatus of claim 12, wherein the third controller is configured to cause the operation unit to inform of information including an abnormality type or an abnormality handling method when the information stored in the leakage history storage area provided to the memory of the third controller is changed from the first information to the second information.

14. A refrigeration cycle apparatus, comprising:
a refrigeration cycle configured to circulate refrigerant;

a heat exchanger unit configured to accommodate at least a heat exchanger of the refrigeration cycle; and
a controller configured to control the heat exchanger unit, the heat exchanger unit comprising a refrigerant detector configured to detect the refrigerant;
the controller comprising
a control board to which the refrigerant detector is unremovably connected, and
a nonvolatile memory provided on the control board, the nonvolatile memory being provided with a failure history storage area for storing any one of first information indicating a state of having no failure history in the refrigerant detector and second information indicating a state of having a failure history in the refrigerant detector at a time, wherein
changing of the information stored in the failure history storage area is allowed only in one way from the first information to the second information, and
the controller is configured to change the information stored in the failure history storage area from the first information to the second information when the refrigerant detector fails.

15. The refrigeration cycle apparatus of claim 14, wherein the heat exchanger unit further comprises an air-blowing fan, and
the controller is configured to operate the air-blowing fan when the information stored in the failure history storage area is changed from the first information to the second information.

16. The refrigeration cycle apparatus of claim 14, further comprising an outdoor unit configured to accommodate at least a compressor of the refrigeration cycle,
the controller comprising
a first controller comprising the control board and the nonvolatile memory,
a second controller communicably connected to the first controller and configured to control the outdoor unit, wherein
a memory of the second controller is provided with a failure history storage area corresponding to the failure history storage area provided to the nonvolatile memory, and
the failure history storage area provided to the memory of the second controller is configured to store the same information as the information stored in the failure history storage area provided to the nonvolatile memory.

17. The refrigeration cycle apparatus of claim 16, wherein the second controller is configured to stop the compressor when the information stored in the failure history storage area provided to the memory of the second controller is changed from the first information to the second information.

18. The refrigeration cycle apparatus of claim 14, further comprising an operation unit comprising a display unit or an audio output unit that is configured to inform of information,
the controller comprising
a first controller comprising the control board and the nonvolatile memory, and
a third controller communicably connected to the first controller and configured to control the operation unit, wherein
a memory of the third controller is provided with a failure history storage area corresponding to the failure history storage area provided to the nonvolatile memory, and
the failure history storage area provided to the memory of the third controller is configured to store the same information as the information stored in the failure history storage area provided to the nonvolatile memory.

19. The refrigeration cycle apparatus of claim 18, wherein the third controller is configured to cause the operation unit to inform of information including an abnormality type or an abnormality handling method when the information stored in the failure history storage area provided to the memory of the third controller is changed from the first information to the second information.

20. A refrigeration cycle system, comprising:
a refrigeration cycle apparatus including
a refrigeration cycle configured to circulate refrigerant, and
a controller configured to control the refrigeration cycle,
an air-blowing fan controlled by the controller, and
a refrigerant detector configured to detect a concentration of leaked refrigerant and to output a detection signal to the controller,
the controller being configured to operate the air-blowing fan when detecting leakage of the refrigerant, and to stop the air-blowing fan after a temporal change of the concentration of the leaked refrigerant changes from positive to negative, wherein
the controller is configured to operate the stopped air-blowing fan again when the temporal change of the concentration of the leaked refrigerant becomes positive, and
the temporal change of the concentration of refrigerant includes continuously detecting the concentration of the refrigerant with predetermined time intervals from an initial detection of refrigerant leakage.

21. A refrigeration cycle system, comprising:
a refrigeration cycle apparatus comprising
a refrigeration cycle configured to circulate refrigerant, and
a controller configured to control the refrigeration cycle,
an air-blowing fan controlled by the controller, and
a refrigerant detector configured to detect a concentration of leaked refrigerant and to output a detection signal to the controller,
the controller being configured to operate the air-blowing fan when detecting leakage of the refrigerant, and to stop the air-blowing fan when a temporal change of the concentration of the leaked refrigerant is negative, wherein
the controller is configured to operate the stopped air-blowing fan again when the temporal change of the concentration of the leaked refrigerant becomes positive, and
the temporal change of the concentration of refrigerant includes continuously detecting the concentration of the refrigerant with predetermined time intervals from an initial detection of refrigerant leakage.

22. A refrigeration cycle system, comprising:
a refrigeration cycle apparatus comprising
a refrigeration cycle configured to circulate refrigerant, and
a controller configured to control the refrigeration cycle, and
a refrigerant detector configured to detect the refrigerant, the controller comprising
a control board to which the refrigerant detector is unremovably connected, and
a nonvolatile memory provided on the control board, the nonvolatile memory being provided with a leakage history storage area for storing any one of first information indicating a state of absence of refrigerant leakage history and second information indicating a state of presence of a refrigerant leakage history at a time, wherein changing of the information stored in the leakage history storage area is allowed only in one way from the first information to the second information, and the controller is configured to change the information stored in the leakage history storage area from the first information to the second information when detecting the leakage of the refrigerant.

23. A refrigeration cycle system, comprising:

a refrigeration cycle apparatus comprising
- a refrigeration cycle configured to circulate refrigerant, and
- a controller configured to control the refrigeration cycle; and a refrigerant detector configured to detect the refrigerant, the controller comprising
- a control board to which the refrigerant detector is unremovably connected, and
- a nonvolatile memory provided on the control board,
- the nonvolatile memory being provided with a failure history storage area for storing any one of first information indicating a state of having no failure history in the refrigerant detector and second information indicating a state of having a failure history in the refrigerant detector at a time, wherein changing of the information stored in the failure history storage area is allowed only in one way from the first information to the second information, and the controller is configured to change the information stored in the failure history storage area from the first information to the second information when the refrigerant detector fails.

24. A refrigeration cycle apparatus, comprising:

a refrigeration cycle configured to circulate refrigerant;

a heat exchanger unit configured to accommodate at least a heat exchanger of the refrigeration cycle; and a controller configured to control the heat exchanger unit, the heat exchanger unit comprising an air-blowing fan, and a refrigerant detector configured to detect a concentration of leaked refrigerant and to output a detection signal to the controller, and the controller being configured to operate the air-blowing fan when detecting leakage of the refrigerant, and to stop the air-blowing fan after a temporal change of the concentration of the leaked refrigerant changes from positive to negative, wherein the controller delays any determination of whether the temporal change of the concentration of the leaked refrigerant changes from positive to negative until after a predetermined time period has elapsed since a startup of the air-blowing fan, and the temporal change of the concentration of refrigerant includes continuously detecting the concentration of the refrigerant with predetermined time intervals from an initial detection of refrigerant leakage.

25. A refrigeration cycle apparatus, comprising:

a refrigeration cycle configured to circulate refrigerant;

a heat exchanger unit configured to accommodate at least a heat exchanger of the refrigeration cycle; and a controller configured to control the heat exchanger unit, the heat exchanger unit comprising an air-blowing fan, and a refrigerant detector configured to detect a concentration of leaked refrigerant and to output a detection signal to the controller, and the controller being configured to operate the air-blowing fan when detecting leakage of the refrigerant, and to stop the air-blowing fan when a temporal change of the concentration of the leaked refrigerant is negative, wherein the controller delays any determination of whether the temporal change of the concentration of the leaked refrigerant is negative until after a predetermined time period has elapsed since a startup of the air-blowing fan, and the temporal change of the concentration of refrigerant includes continuously detecting the concentration of the refrigerant with predetermined time intervals from an initial detection of refrigerant leakage.

* * * * *